US011999525B2

(12) United States Patent
Bontrager et al.

(10) Patent No.: US 11,999,525 B2
(45) Date of Patent: Jun. 4, 2024

(54) COVER AND DRAINAGE FOR A FOOD CONTAINER

(71) Applicant: Congruens Group, LLC, San Carlos, CA (US)

(72) Inventors: Rick Bontrager, San Carlos, CA (US); Casper Chiang, San Carlos, CA (US); Alexander John Garden, San Carlos, CA (US)

(73) Assignee: Congruens Group, LLC, San Carlos, CA (US)

( * ) Notice: Subject to any disclaimer, the term of this patent is extended or adjusted under 35 U.S.C. 154(b) by 297 days.

(21) Appl. No.: 17/422,534

(22) PCT Filed: Jan. 14, 2020

(86) PCT No.: PCT/US2020/013569
§ 371 (c)(1),
(2) Date: Jul. 13, 2021

(87) PCT Pub. No.: WO2020/150280
PCT Pub. Date: Jul. 23, 2020

(65) Prior Publication Data
US 2022/0097897 A1    Mar. 31, 2022

Related U.S. Application Data

(60) Provisional application No. 62/793,244, filed on Jan. 16, 2019.

(51) Int. Cl.
*B65D 21/02* (2006.01)
*B65D 1/26* (2006.01)
(Continued)

(52) U.S. Cl.
CPC ............... *B65D 1/26* (2013.01); *B65D 1/36* (2013.01); *B65D 21/0223* (2013.01);
(Continued)

(58) Field of Classification Search
CPC ........ B65D 1/26; B65D 1/36; B65D 21/0223; B65D 43/0208; B65D 81/261;
(Continued)

(56) References Cited

U.S. PATENT DOCUMENTS 132,808 A    11/1872  Currier
1,236,360 A   8/1917  Rice
(Continued)

FOREIGN PATENT DOCUMENTS

AU    1977025870    6/1976
AU    2018211256    8/2018
(Continued)

OTHER PUBLICATIONS

Casper W. Chang et al., "Container for Transport and Storage of Food Products," U.S. Appl. No. 62/311,787, filed Mar. 22, 2016, 50 pages.
(Continued)

*Primary Examiner* — King M Chu
(74) *Attorney, Agent, or Firm* — Goodwin Procter LLP

(57) ABSTRACT

Systems and methods for providing compostable food containers, which preserve the quality of a food product for an extended duration of time, and which optionally, allow for cooking of the food product therein. In some implementations, the food containers are sturdy, stackable, insulating, and require minimal or no manual labor to assemble. In some implementations, the food container includes a base and a cover, which cooperate to form a closed chamber for supporting, protecting, insulating and optionally cooking a food product, such as a pizza. The base and cover may each be formed of a single layer of material including, but not limited to, molded sugarcane fiber ("bagasse"), molded wood fiber, molded bamboo fiber, molded paper or plastic.

20 Claims, 14 Drawing Sheets

(51) Int. Cl.
*B65D 1/36* (2006.01)
*B65D 43/02* (2006.01)
*B65D 81/26* (2006.01)

(52) U.S. Cl.
CPC ....... *B65D 43/0208* (2013.01); *B65D 81/261* (2013.01); *B65D 2543/00092* (2013.01); *B65D 2543/00351* (2013.01); *B65D 2543/00657* (2013.01); *B65D 2543/00685* (2013.01); *B65D 2543/00731* (2013.01); *B65D 2543/00796* (2013.01); *B65D 2543/00842* (2013.01); *B65D 2585/366* (2013.01)

(58) Field of Classification Search
CPC ........... B65D 2543/00092; B65D 2543/00351; B65D 2543/00657; B65D 2543/00685; B65D 2543/00731; B65D 2543/00796; B65D 2543/00842; B65D 2543/00953; B65D 2585/366
USPC .......................... 206/525; 220/23.4; 426/115
See application file for complete search history.

(56) References Cited

U.S. PATENT DOCUMENTS

| | | |
|---|---|---|
| 1,587,288 A | 6/1926 | Dooly |
| D1,718,668 | 6/1929 | Smythe |
| 2,301,510 A | 11/1942 | Bolen |
| 3,132,423 A | 5/1964 | De Lano |
| 3,155,303 A | 11/1964 | Fenkel |
| 3,268,198 A | 8/1966 | Swett |
| 3,392,468 A | 7/1968 | Wolf |
| D215,766 S | 10/1969 | Dusek |
| 3,664,256 A | 5/1972 | Peirce |
| D223,854 S | 6/1972 | Swett |
| 3,929,564 A | 12/1975 | Reifers |
| 3,954,178 A | 5/1976 | Mason, Jr. |
| 3,985,991 A | 10/1976 | Levinson |
| D242,108 S | 11/1976 | Dart |
| D243,912 S | 4/1977 | Daenen |
| D244,065 S | 4/1977 | Daenen |
| D245,384 S | 8/1977 | Ashton |
| 4,061,241 A | 12/1977 | Retelny |
| 4,120,398 A | 10/1978 | Braddon |
| 4,127,189 A | 11/1978 | Shumrack et al. |
| D252,008 S | 6/1979 | Jeambey |
| 4,197,940 A | 4/1980 | DeRossett |
| 4,360,118 A | 11/1982 | Stern |
| 4,373,633 A | 2/1983 | Lutz, Sr. |
| 4,373,636 A | 2/1983 | Hoffman |
| 4,498,586 A | 2/1985 | Vitale |
| 4,632,836 A | 12/1986 | Abbott et al. |
| 4,656,068 A | 4/1987 | Raines |
| 4,816,646 A | 3/1989 | Solomon et al. |
| 4,886,179 A | 12/1989 | Volk |
| D306,118 S | 2/1990 | Guerrero |
| D307,243 S | 4/1990 | Baker |
| 4,919,477 A | 4/1990 | Bingham et al. |
| 5,101,997 A | 4/1992 | Bagwell et al. |
| D333,754 S | 3/1993 | Conti |
| 5,215,775 A | 6/1993 | Hoffman, Jr. |
| 5,271,518 A | 12/1993 | Webb |
| 5,273,174 A | 12/1993 | Fisher |
| D348,219 S | 6/1994 | Goldberg |
| D350,046 S | 8/1994 | Zimmerman |
| 5,377,860 A | 1/1995 | Littlejohn et al. |
| 5,411,140 A | 5/1995 | Byer |
| 5,423,477 A | 6/1995 | Valdman et al. |
| D361,594 S | 8/1995 | Salis |
| D363,219 S | 10/1995 | Borsboom |
| 5,472,139 A | 12/1995 | Valdman et al. |
| 5,518,133 A | 5/1996 | Hayes et al. |
| D371,511 S | 7/1996 | Giarracca |
| D373,704 S | 9/1996 | Doxey |
| D375,261 S | 11/1996 | Fiori |
| 5,732,610 A | 3/1998 | Halladay et al. |
| D393,801 S | 4/1998 | Hayes et al. |
| D394,005 S | 5/1998 | Marijnissen |
| D395,599 S | 6/1998 | Wyslotsky |
| D398,846 S | 9/1998 | Wyslotsky |
| D398,847 S | 9/1998 | Wyslotsky et al. |
| D398,848 S | 9/1998 | Wyslotsky |
| D400,394 S | 11/1998 | Banach et al. |
| 5,873,294 A | 2/1999 | Scuito |
| 5,878,904 A | 3/1999 | Schweigert |
| D415,652 S | 10/1999 | Loew |
| 5,997,924 A | 12/1999 | Olander, Jr. et al. |
| D433,334 S | 11/2000 | Hayes et al. |
| D438,466 S | 3/2001 | Fletcher et al. |
| D440,490 S | 4/2001 | Lizzio |
| 6,257,434 B1 | 7/2001 | Lizzio |
| D473,791 S | 4/2003 | Loris |
| 6,568,586 B1 | 5/2003 | Van Esley et al. |
| 6,601,758 B2 | 8/2003 | Lizzio |
| 6,627,862 B1 | 9/2003 | Pedersen |
| D482,283 S | 11/2003 | Wichmann et al. |
| D484,412 S | 12/2003 | Willis |
| D484,749 S | 1/2004 | Garraway |
| D502,050 S | 2/2005 | Munson et al. |
| 6,858,243 B2 | 2/2005 | Blanchet et al. |
| 6,886,704 B2 | 5/2005 | Hayes |
| 6,902,057 B2 | 6/2005 | Duffy |
| D507,078 S | 7/2005 | Greenfiled |
| 6,957,111 B2 | 10/2005 | Zhu et al. |
| D511,096 S | 11/2005 | Demaggio |
| D524,662 S | 7/2006 | Fager |
| D532,689 S | 11/2006 | Rotta |
| D535,143 S | 1/2007 | Kortleven |
| D546,128 S | 7/2007 | Carlson |
| D547,602 S | 7/2007 | Yamasaki |
| D549,050 S | 8/2007 | Spencer et al. |
| D553,819 S | 10/2007 | Brothers |
| D556,567 S | 12/2007 | Templeton |
| D562,135 S | 2/2008 | Studee |
| D563,785 S | 3/2008 | Maki et al. |
| D573,466 S | 7/2008 | White et al. |
| D575,112 S | 8/2008 | Since |
| 7,505,929 B2 | 3/2009 | Angert et al. |
| D598,714 S | 8/2009 | Aagaard |
| 7,678,036 B1 | 3/2010 | Malitas et al. |
| D618,562 S | 6/2010 | Bizzell |
| D620,765 S | 8/2010 | Sudia |
| D620,766 S | 8/2010 | Sudia |
| D621,650 S | 8/2010 | DeLeo |
| 7,778,773 B2 | 8/2010 | Yaqub et al. |
| D623,061 S | 9/2010 | Wong |
| D632,957 S | 2/2011 | Kirsch |
| 7,884,306 B2 | 2/2011 | Leach |
| 7,900,793 B2 | 3/2011 | Hanson et al. |
| 7,942,268 B2 | 5/2011 | Manca |
| D641,233 S | 7/2011 | Pugh |
| 7,984,667 B2 | 7/2011 | Freudinger |
| D644,118 S | 8/2011 | Giles |
| D645,711 S | 9/2011 | Sudia |
| D653,906 S | 2/2012 | Bull |
| D653,907 S | 2/2012 | Backaert et al. |
| 8,343,560 B2 | 1/2013 | Blythe et al. |
| 8,430,262 B2 | 4/2013 | Corbett et al. |
| D684,046 S | 6/2013 | Meyer |
| D684,462 S | 6/2013 | Hite |
| 8,549,432 B2 | 10/2013 | Warner |
| 8,561,823 B1 | 10/2013 | Krupa |
| D696,066 S | 12/2013 | Parikh |
| D699,106 S | 2/2014 | Glaser |
| D701,567 S | 3/2014 | Abdullah |
| 8,663,419 B2 | 3/2014 | Corbett et al. |
| 8,807,377 B2 | 8/2014 | Corbett et al. |
| D714,101 S | 9/2014 | Gartz et al. |
| 8,858,858 B2 | 10/2014 | Middleton et al. |
| D720,227 S | 12/2014 | Corbett et al. |
| D722,814 S | 2/2015 | Heiberg |
| 8,991,635 B2 | 3/2015 | Myerscough |
| 9,005,348 B2 | 4/2015 | Ott |

(56) References Cited

U.S. PATENT DOCUMENTS

| | | |
|---|---|---|
| 9,010,621 B2 | 4/2015 | Baker et al. |
| 9,073,666 B2 | 7/2015 | Petlak et al. |
| 9,114,916 B2 | 8/2015 | Knipe |
| 9,126,717 B2 | 9/2015 | Myerscough |
| 9,126,719 B2 | 9/2015 | Corbett et al. |
| D747,221 S | 1/2016 | Changpan |
| D748,329 S | 1/2016 | Bagai et al. |
| D749,906 S | 2/2016 | Lee |
| 9,292,889 B2 | 3/2016 | Garden |
| D761,103 S | 7/2016 | Lebon |
| 9,387,786 B2 | 7/2016 | Weiner et al. |
| 9,446,889 B2 | 9/2016 | Lopes et al. |
| D769,051 S | 10/2016 | Lee |
| D769,057 S | 10/2016 | Lee |
| D769,058 S | 10/2016 | Lee |
| 9,504,340 B2 | 11/2016 | Starr |
| D774,900 S | 12/2016 | Longoni et al. |
| 9,522,761 B2 | 12/2016 | Baker et al. |
| D775,500 S | 1/2017 | Hogeback |
| D795,069 S | 8/2017 | Haddad |
| D795,070 S | 8/2017 | Haddad |
| 9,730,555 B1 | 8/2017 | Lee |
| D801,176 S | 10/2017 | Lynd et al. |
| 9,815,191 B2 | 11/2017 | Oleynik |
| D804,322 S | 12/2017 | Fox et al. |
| D804,962 S | 12/2017 | Fox et al. |
| D806,575 S | 1/2018 | Collins et al. |
| D811,214 S | 2/2018 | Wu |
| D827,452 S | 9/2018 | Collins et al. |
| D828,161 S | 9/2018 | Collins et al. |
| D829,512 S | 10/2018 | Masanek, Jr. |
| D833,204 S | 11/2018 | Lee |
| 10,213,048 B2 | 2/2019 | Lee |
| D843,207 S | 3/2019 | Das et al. |
| D859,936 S | 9/2019 | Buck |
| D861,422 S | 10/2019 | Collins |
| D866,249 S | 11/2019 | Chiang |
| D872,599 S | 1/2020 | Krueger |
| D884,486 S | 5/2020 | Chiang |
| 10,654,640 B2 | 5/2020 | Chiang |
| D918,712 S | 5/2021 | Bontrager |
| 2002/0037378 A1* | 3/2002 | Littlejohn ............... B32B 27/08 220/780 |
| 2002/0040862 A1 | 4/2002 | Lizzio |
| 2002/0048624 A1 | 4/2002 | Blanchet et al. |
| 2002/0148845 A1 | 10/2002 | Zettle et al. |
| 2003/0037681 A1 | 2/2003 | Zhu et al. |
| 2005/0109653 A1 | 5/2005 | Wnek et al. |
| 2005/0189350 A1 | 9/2005 | Hayes et al. |
| 2005/0193901 A1 | 9/2005 | Buehler |
| 2006/0175223 A1 | 8/2006 | Casanovas |
| 2006/0213916 A1 | 9/2006 | Brown et al. |
| 2006/0226669 A1 | 10/2006 | Tong et al. |
| 2007/0241110 A1 | 10/2007 | Belleggia |
| 2007/0295631 A1 | 12/2007 | Lin |
| 2008/0023459 A1 | 1/2008 | Leach |
| 2008/0128313 A1 | 6/2008 | Anderson |
| 2008/0275643 A1 | 11/2008 | Yaqub et al. |
| 2009/0048890 A1 | 2/2009 | Burgh |
| 2009/0057381 A1* | 3/2009 | Gokhale ................. B65D 1/26 229/406 |
| 2010/0065562 A1 | 3/2010 | Vovan |
| 2010/0122930 A1 | 5/2010 | Manca |
| 2010/0170899 A1 | 7/2010 | Mithal et al. |
| 2010/0200591 A1 | 8/2010 | Myerscough |
| 2011/0036846 A1 | 2/2011 | Corbett et al. |
| 2011/0086141 A1 | 4/2011 | Strilich et al. |
| 2011/0220652 A1 | 9/2011 | Corbett et al. |
| 2012/0006842 A1 | 1/2012 | Overgaag |
| 2012/0024859 A1 | 2/2012 | Longoni |
| 2012/0024897 A1 | 2/2012 | Corbett et al. |
| 2012/0031901 A1 | 2/2012 | Dudson et al. |
| 2012/0175367 A1 | 7/2012 | Lopes et al. |
| 2012/0234717 A1 | 9/2012 | Kirkland |
| 2012/0298673 A1 | 11/2012 | Chen |
| 2013/0313257 A1 | 11/2013 | Gartz et al. |
| 2014/0370167 A1 | 12/2014 | Garden |
| 2015/0068945 A1 | 3/2015 | Baker et al. |
| 2015/0068946 A1 | 3/2015 | Baker et al. |
| 2015/0109653 A1 | 4/2015 | Greer et al. |
| 2015/0290795 A1 | 10/2015 | Oleynik |
| 2015/0343933 A1 | 12/2015 | Weiner et al. |
| 2016/0162833 A1 | 6/2016 | Garden |
| 2016/0214778 A1 | 7/2016 | Goodsell et al. |
| 2017/0275077 A1 | 9/2017 | Chiang et al. |
| 2018/0022523 A1 | 1/2018 | Noferi |
| 2018/0029764 A1 | 2/2018 | Chung et al. |
| 2018/0071939 A1 | 3/2018 | Garden et al. |
| 2018/0105344 A1 | 4/2018 | Chiang |
| 2018/0121037 A1 | 5/2018 | Wajda et al. |
| 2018/0215523 A1 | 8/2018 | Chiang |
| 2019/0009968 A1 | 1/2019 | Chiang et al. |
| 2019/0218711 A1 | 7/2019 | Chung et al. |
| 2019/0300263 A1 | 10/2019 | Chiang |
| 2019/0315564 A1 | 10/2019 | Chung et al. |
| 2020/0024806 A1 | 1/2020 | Chung et al. |

FOREIGN PATENT DOCUMENTS

| | | |
|---|---|---|
| CN | 301396948 S | 12/2010 |
| EP | 0989067 | 3/2000 |
| EP | 2230184 | 9/2010 |
| EP | 2243723 | 10/2010 |
| EP | 3006370 | 7/2018 |
| JP | 07-002285 U | 1/1995 |
| JP | 2002-347944 | 12/2002 |
| JP | 5244344 | 7/2013 |
| KR | 20-0360448 | 8/2004 |
| KR | 10-2009-0098949 | 9/2009 |
| KR | 10-2015-0121771 | 10/2015 |
| KR | 30-0990068 | 1/2019 |
| WO | 2012/005683 | 1/2012 |
| WO | 2015/006649 | 1/2015 |

OTHER PUBLICATIONS

Core77 "Notable Packaging Award: Core77 Design Awards 2017, Zume Pizza 'Pizza Pod'" May 14, 2017, https://web.archive.org/web/20170614144555/http://designawards.core77.com/Packaging/62804/Zume-Pizza-Pod, downloaded on Mar. 26, 2018, 4 pages.

Divya, "Sealed Air and Kuraray to Invest in Capacity at Simpsonville Facility to Produce Plant-Based Food Packaging", Mar. 22, 2019, located online on May 8, 2019 at: https://packaging360.in/news/sealed-air-invests-in-to-simpsonville-facility-to-produce-pla . . . , 7 pages.

DuPont, "Compostable "Pizza Pod" (Zume Pizza, USA)—Diamond Finalist Award," May 22, 2017, downloaded from http://www.dupont.com/industries/packaging-and-printing/media/press-kits/2017-packaging-awards/mc-image-detail/compostable-pizza-pod.html on Apr. 20, 2018, 1 page.

Entis et al., "This Robot-Made Pizza Is Baked in the Van on the Way to Your Door," Sep. 29, 2016, downloaded from http://fortune.com/2016/09/29/this-robot-made-pizza-is-baked-in-the-van-on-the-way-to-your-front-door/ on Apr. 20, 2018, 1 page.

European Search Report in Application 17770987.0, dated Feb. 12, 2019, 8 pages.

Farkya, "Compostable Pizza Pod," Nov. 14, 2016, downloaded from http://www.packagingconnections.com/news/compostable-pizzapod.htm on Apr. 20, 2018, 7 pages.

Garden, "Systems and Methods of Preparing Food Products," Notice of Allowance, dated Jan. 7, 2016, for U.S. Appl. No. 13/920,998, 9 pages.

Garden, "Systems and Methods of Preparing Food Products," U.S. Appl. No. 15/040,866, filed Feb. 10, 2016, 71 pages.

Garden, "Systems and Methods of Preparing Food Products," Advisory Action, dated Aug. 27, 2015, for U.S. Appl. No. 13/920,998, 3 pages.

Garden, "Systems and Methods of Preparing Food Products," Advisory Action, dated Jul. 29, 2015, for U.S. Appl. No. 13/920,998, 3 pages.

(56) References Cited

OTHER PUBLICATIONS

Garden,"Systems and Methods of Preparing Food Products," Amendment, filed Apr. 2, 2015, for U.S. Appl. No. 13/920,998, 23 pages.
Garden,"Systems and Methods of Preparing Food Products," Amendment, filed Aug. 10, 2015, for U.S. Appl. No. 13/920,998, 29 pages.
Garden,"Systems and Methods of Preparing Food Products," Amendment, filed Jul. 22, 2015, for U.S. Appl. No. 13/920,998, 29 pages.
Garden,"Systems and Methods of Preparing Food Products," Amendment, filed Sep. 25, 2015, for U.S. Appl. No. 13/920,998, 29 pages.
Garden,"Systems and Methods of Preparing Food Products," Office Action, dated Mar. 16, 2015, for U.S. Appl. No. 13/920,998, 28 pages.
Garden,"Systems and Methods of Preparing Food Products," Office Action, dated May 27, 2015, for U.S. Appl. No. 13/920,998, 31 pages.
Gardner, "Systems and Methods of Preparing Food Products," Response to Restriction Requirement, filed Oct. 24, 2014, for U.S. Appl. No. 13/920,998, 3 pages.
Gardner, "Systems and Methods of Preparing Food Products," Restriction Requirement, dated Sep. 10, 2014, for U.S. Appl. No. 13/920,998, 5 pages.
Kelley, Mary K., "Caffeine Fix: The Design of Coffee Cup Lids", from Mary Kate's Experience with Human Factors, found online at: https://sites.tufts.edu/mkelleyhfintro/2018/04/12/caffeine-fix-the-design-of-coffee-cup-lids/, Apr. 12, 2018, 8 pages.
Molina, "Yes, Apple really did patent its own pizza box," May 17, 2017, downloaded from https://www.usatoday.com/story/tech/talkingtech/2017/05/17/apple-patented-its-own-pizza-box/327267001/ on Apr. 20, 2018, 2 pages.
Notice of Allowance dated Feb. 13, 2019, issued in U.S. Appl. No. 29/558,874, 10 pages.
Notice of Allowance, dated Jul. 24, 2018, for U.S. Appl. No. 29/618,670, Collins et al., "Food Container," 2 pages.
Notice of Allowance, dated Jun. 6, 2018, for U.S. Appl. No. 29/618,670, Collins et al., "Food Container," 2 pages.
Notice of Allowance, dated May 31, 2018, for U.S. Appl. No. 29/574,805, Collins et al., "Food Container Cover," 2 pages.
Notice of Allowance, dated Apr. 25, 2018, for U.S. Appl. No. 29/618,670, Collins et al., "Food Container" 7 pages.
Notice of Allowance, dated May 9, 2018, for U.S. Appl. No. 29/574,805, Collins et al., "Food Container and Cover", 10 pages.
Office Action dated Aug. 28, 2018 issued in U.S. Appl. No. 15/845,916, 24 pages.
Office Action dated Aug. 30, 2018 issued in U.S. Appl. No. 15/936,069, 14 pages.
Office Action dated Dec. 20, 2018 issued in U.S. Appl. No. 15/465,228, 27 pages.
PCT International Preliminary Report on Patentability in Application PCT/US2018/040749, dated Jan. 16, 2020, 20 pages.
PCT International Preliminary Report on Patentability in Application PCT/US2020/013569, dated Jul. 29, 2021, 13 pages.
PCT International Preliminary Report on Patentability in International Application PCT/US2020/013580, dated Jul. 29, 2021, 12 pages.
PCT International Search Report and Written Opinion in International Application PCT/US2018/040730, dated Nov. 14, 2018, 22 pages.
PCT International Search Report and Written Opinion in International Application PCT/US2020/013580, dated Jun. 26, 2020, 20 pages.
PCT International Search Report and Written Opinion of the International Searching Authority, dated Jun. 26, 2017, for International Application No. PCT/US2017/023408, 17 pages.
PCT International Search Report, dated Oct. 22, 2014, for International Application No. PCT/US2014/042879, 3 pages.
PCT Search Report and Written Opinion dated Nov. 16, 2018 issued in International Patent Application No. PCT/US2018/040749, 24 pages.
PCT Written Opinion of the International Searching Authority, dated Oct. 22, 2014, for International Application No. PCT/US2014/042879, 8 pages.
PW Staff, "Humanitarian initiative wins top DuPont Award," Jul. 5, 2017, downloaded from https://www.packworld.com/article/trendsand-issues/global/humanitarian-initiative-wins-top-dupont-award on Apr. 20, 2018, 12 pages.
Robinson, "This robot-made pizza in Silicon Valley should terrify Domino's and Pizza Hut," Sep. 29, 2016, downloaded from https://sg.financeyahoo.com/news/robot-made-pizza-silicon-valley-16400825.htrnl?guccounter=1 on Apr. 20, 2018, 12 pages.
U.S. Appl. No. 15/465,228, Amendment and Response filed Apr. 18, 2019, 16 pages.
U.S. Appl. No. 15/465,228, Office Action dated Feb. 26, 2020, 27 pages.
U.S. Appl. No. 15/465,228, Office Action dated Jul. 18, 2019, 26 pages.
U.S. Appl. No. 15/845,916, Amendment and Response filed Dec. 28, 2018, 17 pages.
U.S. Appl. No. 15/845,916, Office Action dated Apr. 13, 2020, 22 pages.
U.S. Appl. No. 15/845,916, Office Action dated Apr. 8, 2019, 25 pages.
U.S. Appl. No. 15/845,916, Office Action dated Aug. 14, 2019, 23 pages.
U.S. Appl. No. 15/936,069, Amendment and Response filed Nov. 28, 2018, 14 pages.
U.S. Appl. No. 15/936,069, Notice of Allowance dated Mar. 4, 2020, 5 pages.
U.S. Appl. No. 15/936,069, Notice of Allowance dated May 7, 2020, 2 pages.
U.S. Appl. No. 15/936,069, Office Action dated Mar. 14, 2019, 17 pages.
U.S. Appl. No. 15/936,069, Office Action dated Aug. 14, 2019, 16 pages.
U.S. Appl. No. 16/029,047, Notice of Allowance dated Jan. 13, 2020, 7 pages.
U.S. Appl. No. 16/029,047, Notice of Allowance dated Mar. 11, 2020, 2 pages.
U.S. Appl. No. 16/029,047, Notice of Allowance dated Apr. 3, 2020, 2 pages.
U.S. Appl. No. 16/029,047, Office Action dated Aug. 7, 2019, 6 pages.
U.S. Appl. No. 29/558,872, Amendment and Response filed Feb. 1, 2019, 23 pages.
U.S. Appl. No. 29/558,872, Ex-Parte Quayle Action mailed Nov. 18, 2019, 10 pages.
U.S. Appl. No. 29/558,872, Notice of Allowance dated Mar. 27, 2020, 7 pages.
U.S. Appl. No. 29/558,872, Notice of Allowance dated May 10, 2019, 9 pages.
U.S. Appl. No. 29/558,872, Notice of Allowance dated Jun. 26, 2019, 14 pages.
U.S. Appl. No. 29/558,872, Office Action dated Nov. 1, 2018, 15 pages.
U.S. Appl. No. 29/558,872, Response to Restriction Requirement filed Aug. 16, 2018, 7 pages.
U.S. Appl. No. 29/558,872, Restriction Requirement dated May 17, 2018, 12 pages.
U.S. Appl. No. 29/558,873, Ex Parte Quayle Action mailed Sep. 6, 2018, 9 pages.
U.S. Appl. No. 29/558,873, Notice of Allowance dated Feb. 8, 2019, 9 pages.
U.S. Appl. No. 29/558,873, Notice of Allowance dated Jun. 26, 2019, 11 pages.
U.S. Appl. No. 29/558,873, Response filed Nov. 6, 2018, 18 pages.
U.S. Appl. No. 29/558,873, Response to Restriction Requirement filed Jul. 17, 2018, 16 pages.
U.S. Appl. No. 29/558,873, Restriction Requirement dated May 17, 2018, 9 pages.
U.S. Appl. No. 29/558,874, Ex Parte Quayle Action mailed Feb. 27, 2020, 11 pages.

(56) References Cited

OTHER PUBLICATIONS

U.S. Appl. No. 29/558,874, Ex Parte Quayle Action mailed Sep. 6, 2018, 10 pages.
U.S. Appl. No. 29/558,874, Notice of Allowance dated Feb. 13, 2019, 10 pages.
U.S. Appl. No. 29/558,874, Notice of Allowance dated Jun. 2, 2020, 7 pages.
U.S. Appl. No. 29/558,874, Restriction Requirement dated Apr. 27, 2018, 10 pages.
U.S. Appl. No. 29/574,802, Amendment and Response filed Aug. 3, 2017, 7 pages.
U.S. Appl. No. 29/574,802, Notice of Allowance dated Aug. 25, 2017, 5 pages.
U.S. Appl. No. 29/574,802, Office Action dated Jun. 1, 2017, 9 pages.
U.S. Appl. No. 29/574,805, Notice of Allowance dated Jul. 23, 2018, 2 pages.
U.S. Appl. No. 29/574,808, Amendment and Response filed Dec. 21, 2018, 15 pages.
U.S. Appl. No. 29/574,808, Notice of Allowance dated May 13, 2019, 5 pages.
U.S. Appl. No. 29/574,808, Notice of Allowance dated Jun. 10, 2019, 10 pages.
U.S. Appl. No. 29/574,808, Office Action dated Sep. 21, 2018, 11 pages.
U.S. Appl. No. 29/574,808, Response to Restriction Requirement filed Aug. 1, 2018, 1 page.
U.S. Appl. No. 29/574,808, Restriction Requirement dated Jun. 1, 2018, 9 pages.
U.S. Appl. No. 29/656,406, Notice of Allowance dated Jan. 23, 2020, 10 pages.
U.S. Appl. No. 29/656,406, Notice of Allowance dated Mar. 25, 2020, 2 pages.
U.S. Appl. No. 29/656,406, Notice of Allowance dated Jun. 20, 2019, 12 pages.
U.S. Appl. No. 29/656,406, Notice of Allowance dated Aug. 6, 2019, 2 pages.
U.S. Appl. No. 29/679,891, Notice of Allowance dated Jan. 12, 2021, 5 pages.
U.S. Appl. No. 29/679,891, Office Action dated Sep. 30, 2020, 11 pages.
U.S. Appl. No. 29/698,689, Notice of Allowance dated Apr. 6, 2020, 5 pages.
U.S. Appl. No. 29/698,689, Office Action dated Oct. 24, 2019, 12 pages.
U.S. Appl. No. 29/700,713, Notice of Allowance dated Apr. 8, 2020, 8 pages.
Wiener, "Food Movers: The Secret Evolution of the Pizza Box," Feb. 2016, downloaded from https://www.foodandcity.org/evolution-pizza-box/ on Apr. 20, 2018, 14 pages.
World Centric website, "New PizzaRound from World Centric: The Pizza Box Comes Full Circle", Petaluma, CA, USA, published Mar. 15, 2018, 2 pages, located online on May 2, 2019 at: http://www.worldcentric.org/node/442.
Zume Pizza Homepage: Announced 2015 [Online]. Site Visited [Apr. 20, 2018]. Available from Internet URL: https://zumepizza.com/, 7 pages.
International Search Report and Written Opinion for International Application No. PCT/US2020/013569 dated Jun. 26, 2020 (21 pages).
International Search Report for International Application No. PCT/US2020/013569 dated Jun. 26, 2020 (4 pages).

\* cited by examiner ical patent application No. PCT/US2020/013569, filed 14 Jan. 2020, which claims benefit of U.S. Provisional Patent Application No. 62/793,244, filed on Jan. 16, 2019, entitled "Closure and Drainage for Molded Fiber Packaging," the disclosures of which are hereby incorporated by reference herein in their entireties. To the extent appropriate, a claim of priority is made to each of the above disclosed applications.

COVER AND DRAINAGE FOR A FOOD CONTAINER

CROSS-REFERENCE TO RELATED APPLICATIONS

This application is a National Stage of PCT International patent application No. PCT/US2020/013569, filed 14 Jan. 2020, which claims benefit of U.S. Provisional Patent Application No. 62/793,244, filed on Jan. 16, 2019, entitled "Closure and Drainage for Molded Fiber Packaging," the disclosures of which are hereby incorporated by reference herein in their entireties. To the extent appropriate, a claim of priority is made to each of the above disclosed applications.

TECHNICAL FIELD

The present disclosure generally relates to containers for protecting, insulating, transporting and/or cooking food products.

BACKGROUND

Description of the Related Art

Today, the standard pizza box is a square box that is made from a single folded blank of corrugated cardboard. Once folded, the cardboard forms a box that is normally about two inches high and having equal sides of between 12 inches and 18 inches. The corrugated cardboard used to produce the pizza box is typically thick, which provides the pizza box with structural strength needed to stack multiple filled pizza boxes atop one another without the bottom box collapsing. Even then, stacking two or more pizza boxes together typically requires the ubiquitous pedestals or "pizza savers" which are placed within the box at the approximate center thereof. Pizza savers prevent the top or lid of the pizza box from being forced into contact with the pizza inside the box due to forces of one or more pizza boxes stacked on top of the pizza box. An example of such pizza saver is shown in U.S. Pat. No. 4,498,586.

In a traditional pizza box, the inside bottom surface of the pizza box is flat and smooth. When a pizza is placed inside the box, the bottom of the pizza rests flush against the flat bottom of the box. Consequently, any condensation, grease, or other liquid that collects between the bottom of the pizza and the bottom of the box becomes trapped. This can cause the bottom of a pizza to become soggy or oily, and can also reduce the structural integrity of the pizza box. Additionally, the top of the pizza box absorbs moisture emanating from hot, steaming pizza, which causes the top portion to droop, and which may cause the pizza box to collapse or may at least cause the top portion of the pizza box to touch the top of the pizza in instances where the aforementioned "pizza saver" is not used.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
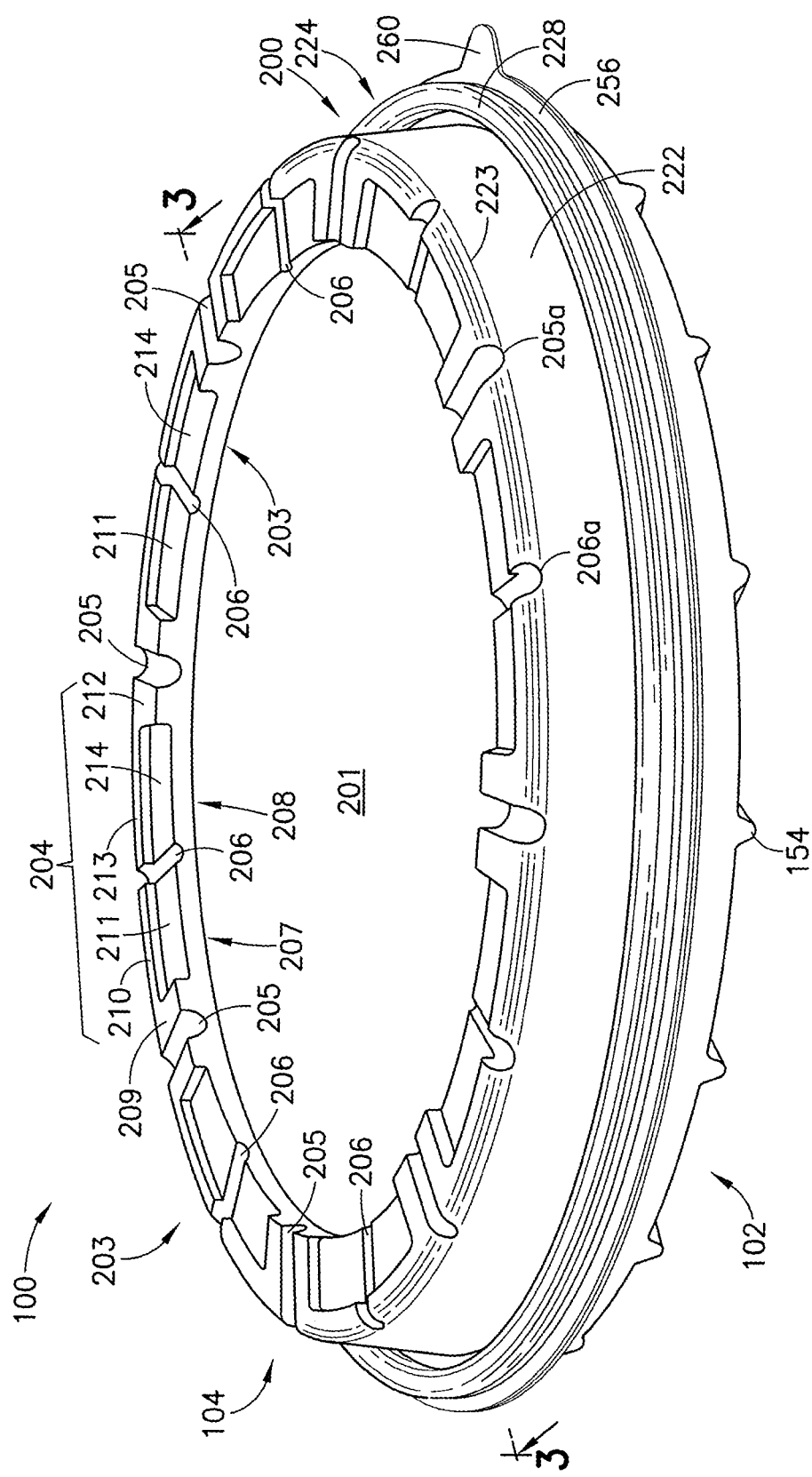
FIG. 1 is a top perspective view of a food container, according to an illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to providing food containers which preserve the quality of a food product for a duration of time, and which optionally allow for cooking of the food product therein. In one or more implementations, the food containers discussed herein are structurally sturdy, stackable, thermally insulating, disposable (e.g., compostable) and require minimal or no manual labor to assemble. In some implementations, the food containers discussed herein use a relatively small amount of material compared to existing corrugated cardboard containers, which material is compostable and/or recyclable. The food contained in the containers may be solid and/or liquid. The width of the containers may be greater than the height, as shown in the illustrated implementations. The containers may also have the same width and height and a greater height than width in other implementations, for example. The containers may be in the form of cups, for example.

FIG. 1-FIG. 13 show various views of a food container 100 in the illustrated implementation. The food container 100 is described and illustrated as a container for containing a pizza for explanatory purposes, but it should be appreciated that the present disclosure is not limited to such.

Figure 2:
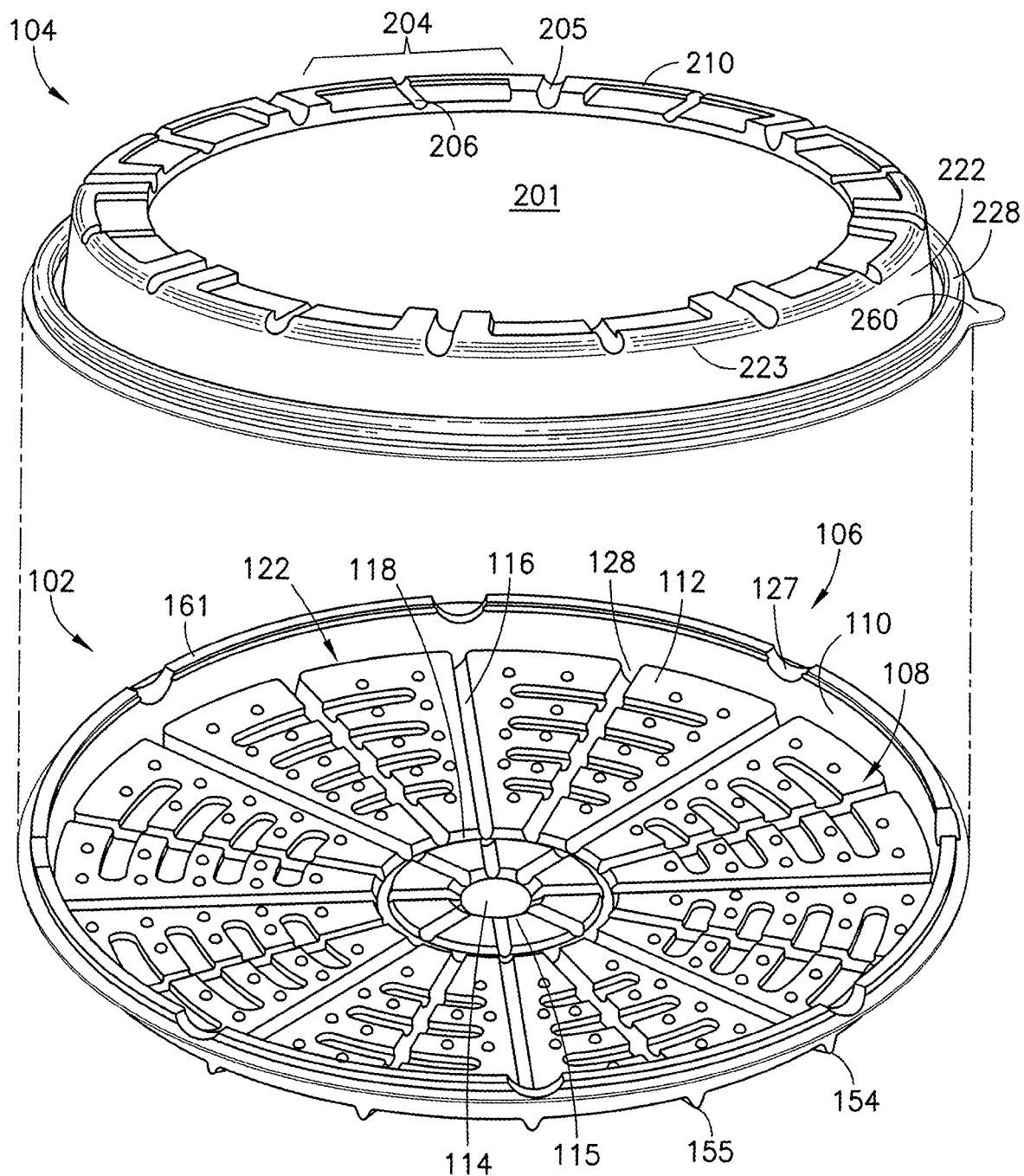
FIG. 2 is a top perspective view of the food container with a cover of the food container separated from a base thereof, according to the illustrated implementation.

FIG. 1 is a top perspective view of the food container 100 in a closed condition, according to an illustrated implementation. The food container 100 includes a base 102 and a separate cover 104. FIG. 2 is a top perspective view of FIG. 1, where the cover 104 of the container 100 is separated from the base 104. In the illustrated implementation, the cover 102 and the base 104 are circular. In other implementations, the cover 102 and the base 104 may have other shapes, such as rectangular, triangular, and octagonal, for example. In addition, in other implementations, the base 102 may be a food supporting apparatus for serving and supporting food in restaurants and at home, for example.

Figure 3:
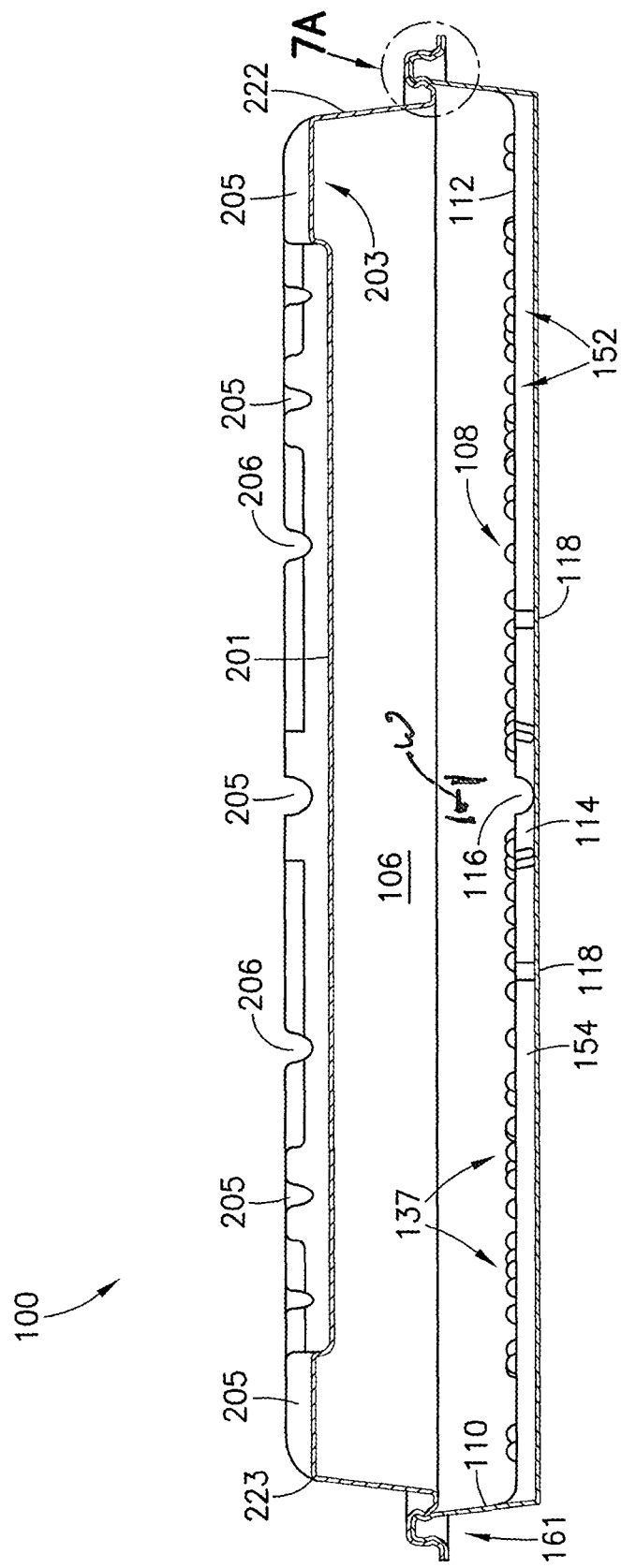
FIG. 3 is a sectional view of the food container of FIG. 1 through line 3-3 of FIG. 1.
Figure 4:
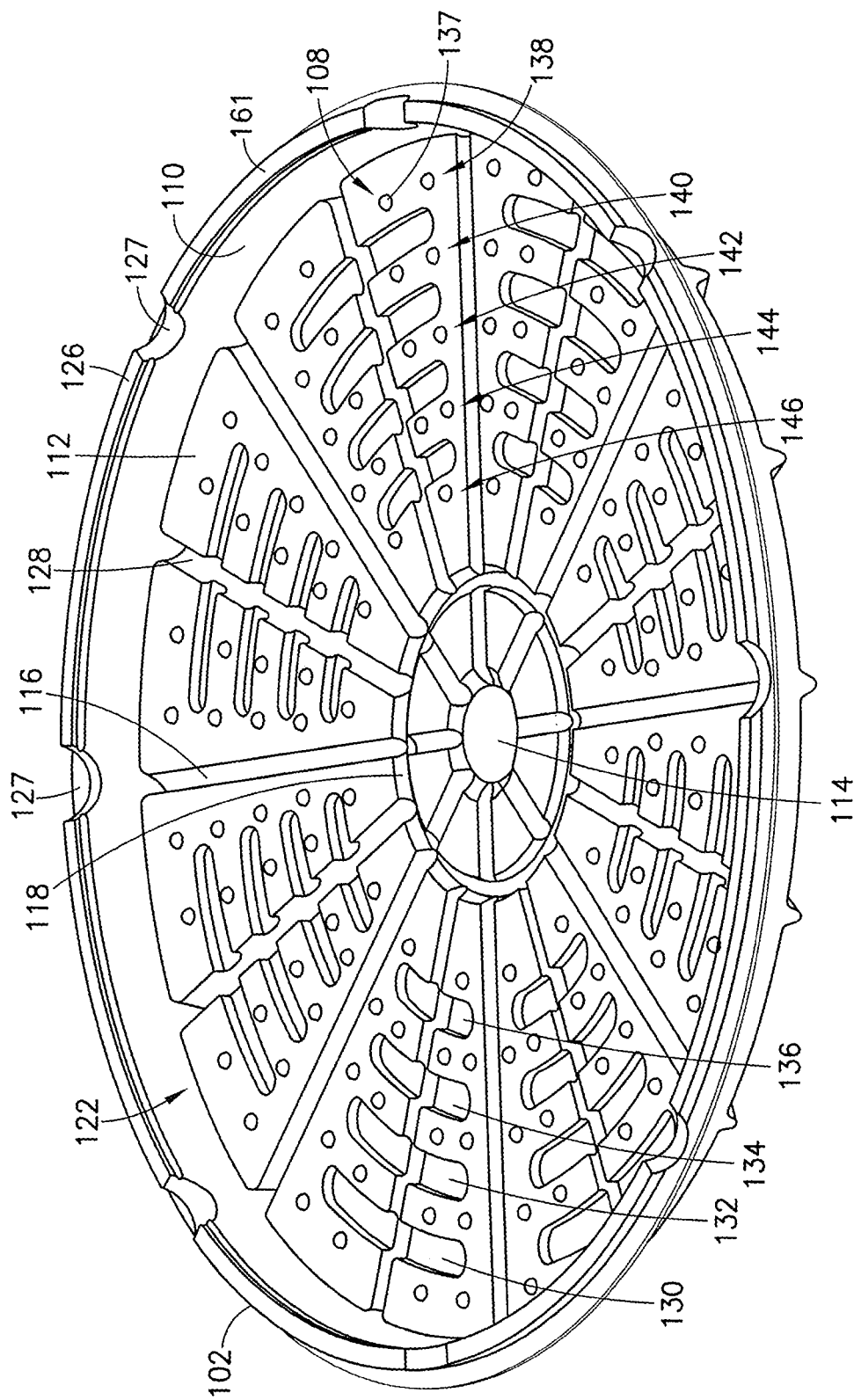
FIG. 4 is a top perspective view of the base of FIG. 1.

FIG. 3 is a sectional view of the container 100 through line 3-3 of FIG. 1. FIG. 4 is a top perspective view of the base separated from the cover 104. As shown in FIG. 3, the container 100 defines a closed chamber between the interior surfaces of the base 102 and the top 104 for supporting, protecting, insulating and optionally cooking a food product, such as pizza, for example. FIG. 3 also shows a connection C between the base 102 and the cover 104, which is discussed in more detail with respect to FIGS. 7A and 7B, for example.

In some implementations, the base 102 and cover 104 may each be separately formed of a single layer of liquid-resistant insulating material including, but not limited to, molded sugarcane fiber ("bagasse"), molded wood fiber, molded bamboo fiber, molded paper or plastic (e.g., biodegradable plastic, thermoplastic material, bio-based plastic, recycled plastic, recyclable plastic). The base 102 and/or the cover 104 may be opaque, semi-transparent, or transparent (e.g., an opaque base made with molded fiber and a cover made with transparent plastic material). This is in contrast to conventional pizza boxes, which are made from corrugated cardboard. In implementations where the base 102 and the cover 104 are formed from molded fibers, the single layer of material may have a relatively small thickness of between 0.5 mm and 1.0 mm (e.g., 0.8 mm). In implementations wherein the base 102 and cover 104 are formed from plastic (e.g., polyethylene terephthalate (PET), polylactic acid (PLA)), the single layer of material may have a thickness of 0.5-0.6 mm or less.

As shown in FIGS. 2-4, for example, the base 102 includes a food-receiving portion 108 that is upwardly facing and circular-shaped in the illustrated implementation. The food-receiving portion 108 is configured to receive the pizza or other food item thereon. The base 102 further includes a sidewall 110 extending upward from a perimeter of the food-receiving portion 108. In the illustrated implementation, the food-receiving portion 108 has a circular perimeter. In other implementations the food-receiving portion 108 may have other shapes, such as rectangular, triangular, or octagonal, for example. The shape of the perimeter of the food-receiving portion 108 may be dependent on the shape of the food to be received.

The food-receiving portion 108 has a planar surface 112 and a number of features that extend at least one of upward or downward from the planar surface 112, as described herein. For example, a central well 114 extends downwardly from the planar surface 112 to receive liquid drippings and condensation from the cooked food placed in the food container 100. In the illustrated implementation, the central well 114 has a circular perimeter 114, but may have other shapes, such as rectangular, triangular, or octagonal, for example, in other implementations.

A plurality of radial channels or grooves 116 extends downwardly below the planar surface 112 and runs radially inward from the upwardly extending sidewall 110 to the central well 114. Each radial channel 116 form a continuous fluid pathway to the central well 114, to convey liquid drippings and condensation to the central well 114, away from the food on the food-receiving portion 108. In some implementations, each radial channel 116 slopes downward from the upwardly extending sidewall 110 toward the central well 114, to facilitate the fluid flow toward the central well. In the illustrated implementation, each of the plurality of radial channels have a U-shaped cross-sectional profile, but in other implementations, the channels may have other shapes (e.g., V-shaped). The radial channels 116 improve the rigidity and strength of the base 102.

In the illustrated implementation, each first radial channel 116 is aligned with an opposite, second radial channel that extends radially from the central well 114 in the opposite direction as the first radial channel. Thus, when the base 102 is to be discarded (e.g., composted), the user may fold the base along an axis that extends through any first and second aligned radial channels 116 to reduce the dimensions of the base so that the base will fit within a compost receptacle.

The central well 114 comprises eight (8) circular segments 115, as shown in FIGS. 2 and 4, for example. Adjacent circular segments 115 are separated by an end of a respective radial channel 116. The radial channels 116 in the illustrated implementation each have constant widths "W," as shown in FIG. 3, for example. The central well 114 has a circumference greater than the sum of the lengths of the eight (8) radial channels 116 at the central well.

A circular groove 118 extends downwardly from the planar surface 112, concentric with the central well 114. The circular groove 118 improves the rigidity and strength of the base 102. The circular groove 118 intersects with and is in fluid communication with the radial channels 116. The circular grove 118 collects liquid drippings and condensation from the food product. If a radial channel is too full of liquid or if the container 100 is tilted, for example, the circular groove 118 may distribute excess liquid drippings and condensation from one radial channel 116 to another. The groove 118 may have other closed shapes in other implementations.

Adjacent radial channels 116, a corresponding portion of the upwardly extending wall 110, and a corresponding portion of the food-receiving portion 108 delineate a respective sector portion 122 of the food-receiving portion 108. Sector portions 122 support respective portions of a food item, such as individual slices of pizza, for example. In the illustrated implementation, the base 102 includes eight (8) pairs of channels 116 defining, in part, eight sector portions 122. Generally, the base 102 may include N pairs of channels defining N sector portions, where N is a positive integer. The plurality of radial channels 116 are equally radially spaced in the illustrated implementation to enable cutting of the food item into equally sized pieces when a cutting tool, such as a knife, moves along the channels. Since the radial channels 116 extend downward from the planar surface 112, a user may cut through the food item over the channels without damaging (e.g., cutting) the food-receiving portion 108 of the base 102.

The upstanding wall 110 includes a peripheral rim 126. In some implementations, because the radial channels 116 may be substantially covered by the food item placed on the food-receiving portion 108, indicia (e.g., visible and/or tactile markings) may be positioned on or adjacent the peripheral rim 126, radially in line with the aligned pairs of radial channels 116, 120 to aid the user in cutting the pizza into pieces along the radial channels with a machine or manually. In this implementation, tactile indicia are provided in the form of indented portions 127 at the top of the upstanding sidewall 110, as best shown in FIGS. 2 and 4, for example. In the illustrated implementation, each of the indented portions 127 has a U-shaped cross-sectional profile, but in other implementations the channels may have other shapes (e.g., V-shaped). An example of a cutting system that may be used to cut pizza or other food items on the food-receiving portion 108 is described in U.S. Patent Publication No. 2018/0071939 A1, which was filed on Nov. 9, 2017, is assigned to the assigned the present application, and is incorporated by referenced herein. A traditional rolling pizza cutter or other cutting knives may also be used.

In the illustrated implementation, each sector portion 122 includes a radial sector channel 128 that extends into the planar surface, as shown in FIGS. 2 and 4, for example. Each radial sector channel 128 starts at the sidewall 110 and terminates at the circular groove 118, bisecting each sector portion 124. A continuous fluid passage is thereby created, extending from the recessed radial sector portion channel 128 to the circular groove 118. The radial sector channels 128 receive liquid drippings and condensation from cooked food placed in the food container 108, and guide them toward the circular groove 118.

In some implementations the radial sector channels 128 slope downward from the upwardly extending sidewall 110 toward the circular groove 118, to facilitate fluid flow. Liquid droppings/condensation from one radial sector portion channel 128 can flow from the circular groove 118 to another radial sector channel for drainage into the central well 114.

In the illustrated implementation, each sector includes four (4) rows of circular groove segments 130, 132, 134, 136. Each circular groove segment extends below the planar surface 112 and are positioned between the upwardly extending sidewall 110 and the circular groove 118. The circular groove segments 130, 132, 134, 136 are positioned along imaginary concentric circles centered on a center of the central well 114, through each sector 122. Each circular groove segment 130, 132, 134, 136 extend over an arc less than the arc of each section 124. In the illustrated implementation, the arc of the sectors 122 is about 45 degrees and the arc of the circular groove segments 130, 132, 134, 136 is about 30 degrees, for example. The respective arcs may be different in other implementations. The circular groove segments 130, 132, 134, 136 are bisected by and are in fluid communication with the radial sector channels 128 in each sector portion 124.

In one implementation, the bottom surfaces of each of the circular groove segments 130, 132, 134, 136 are equally distant from the planar surface 112 over their entire length. This maximizes the amount of liquid that can collect in the circular groove segments 130, 132, 134, 136. In other implementations, each of the circular groove segments 130, 132, 134, 136 in each sector 122 may be angled downward toward the respective radial sector channel 116 in that sector, to improve drainage of liquid from the circular groove segments into the radial sector channel and to the circular groove 118.

In other implementations, different numbers of circular groove segments may be provided and/or the circular groove segments 130, 132, 134, 136 may be provided in different locations than that shown in the illustrated implementation. In addition, the corresponding groove segments may have other shapes and sizes.

In the illustrated implementation, a plurality of dome-shaped protrusions 137 extend upward from the planar surface 112 in each sector portion 124, as shown in FIGS. 2, 3, and 4, for example. In other implementations, the protrusions may have other shapes. Five rows 138, 140, 142, 144, 146 of protrusions 137 are provided in this implementation. More or fewer rows of protrusions 137 may be provided in other implementations.

The first outer row 138 is between the upstanding wall 110 and the outer circular groove segment 130. The middle three rows 140, 142, 144 are between adjacent circular groove segments 130 and 132, 132 and 134, 134 and 136, respectively. The inner row 146 is between the circular groove segment 136 and the circular groove 118. Four (4) protrusions 137 are provided in each of the rows 138, 140, 142, 144, two symmetrically arranged on each side of a respective radial sector channel 128. In the row 146 closest to the circular channel 118, two protrusions 137 are symmetrically arranged on each side of the respective radial sector channel 128. In addition, the protrusions 137 in the four outer rows 138, 140, 142, 144 are radially aligned. The two protrusions 137 in the row 146 are symmetrically positioned with respect to the radial sector channel 128 but are not radially aligned with the protrusions in the other rows 138, 140, 142, 144. Different numbers of protrusion and arrangements of protrusions, may be provided in different implementations.

The protrusions 137 slightly raise the food product supported on the planar surface 112, decreasing heat loss due to conduction through the planar surface 112 compared to food containers with flat bottom surfaces that have relatively large surface area contact with the bottom surface of the food product. In addition, the protrusions 137 tend to isolate portions of the bottom surface of the food product from the planar surface 112, which prevents the food product from becoming soggy due to trapped liquid on the planar surface. Protrusions 137 proximate the radial channels 116, the radial sector channels 128, and the circular groove segments 128, 130, 132, 134 also slightly tilt portions of the food product towards those components so that liquid drippings from the food item fall away from the food item and into the radial channels, radial sector grooves, circular groove segments. This facilitates drainage of liquids into the respective components, decreasing or eliminating sogginess due to trapped liquid on the planar surface 112 of the food-receiving portion 108.

The protrusions 137 adjacent the radial channels 116 may also aid in supporting the food item near the cutting locations along the radial channels, thereby facilitating the cutting process to provide accurate individual pieces.

The radial channels 116, the radial sector grooves 128, the central well 114, the circular groove 118, the circular groove segments 130, 132, 134, 136, and the protrusions 137 each contribute to the strength and/or rigidity of the food container 100. Thus, these features of the food container 100 provide a housing that is lightweight, sturdy, compostable, and that supports the food item in a manner that keeps the food item in a hot and dry condition, preserving the freshness of the food item.

In some implementations, each of a plurality of features of the base 102 comprising the central well 114, the radial channels 116, circular groove segments 118, the radial sector channels 128, the circular groove segments 130, 132, 134, 136, and the protrusions 137 are spaced apart from at least one other of the plurality of features by a distance less than or equal to one inch (25.4 mm). In some implementations, due to the aforementioned plurality of features, the food-receiving portion 108 of the base 102 does not have a continuously planar surface that exceeds 2 inches by 2 inches (50.8 mm). Such features significantly improve the strength of the base 102, while allowing the base to have a diameter greater than 12 inches (30.48 cm) (e.g., 16 inches), an overall height which is less than 1.5 inches (38.1 mm) (e.g., 1 inch) (25.4 mm), and a material thickness between 0.5 mm and 1.0 mm (e.g., 0.8 mm), for example.

Figure 5:
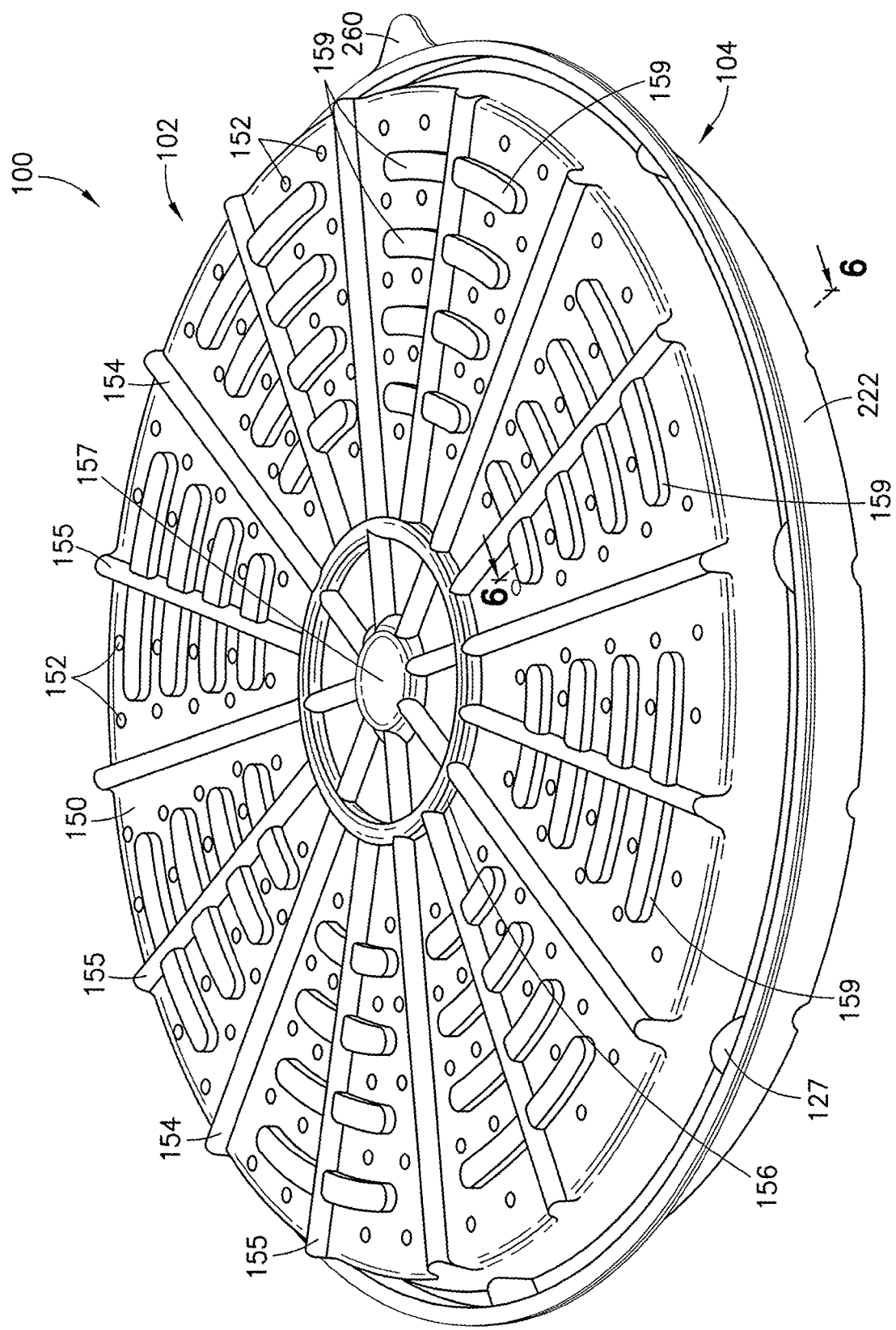
FIG. 5 is a bottom perspective view of the food container of FIG. 1.
Figure 6:
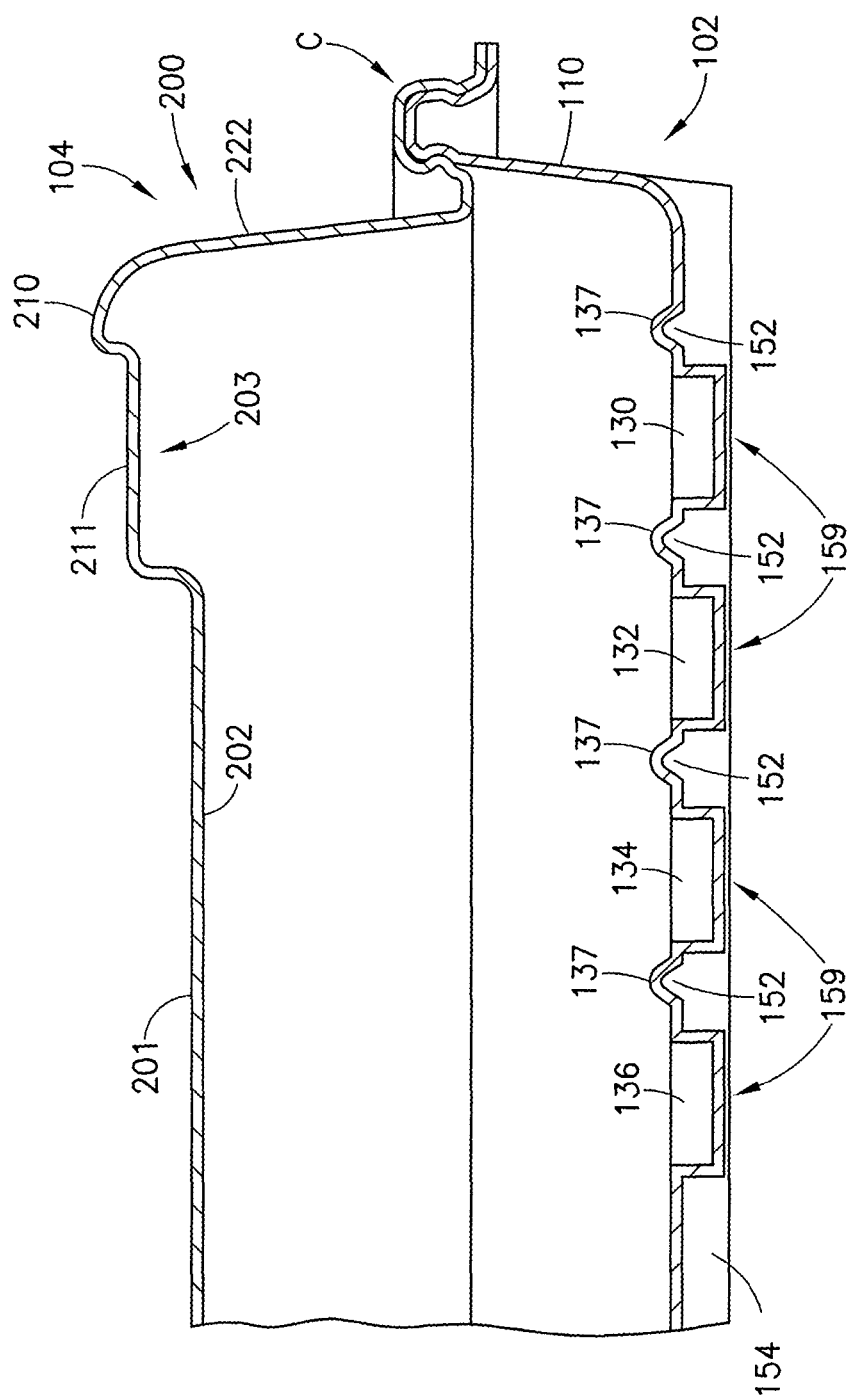
FIG. 6 is a sectional view of the food container taken along the line 6-6 of FIG. 5.

FIG. 5 is a bottom perspective view of the container 100 showing the configurations of the bottom surface 150 of the base 102, connected to the cover 104. In the illustrated implementation, the protrusions 137 form dome-shaped indents 152 in the bottom surface 150 of the base 102, as shown in FIGS. 3, 4, and 6, for example.

The central well 114, the radial channels 116, the circular groove 118, the radial sector channels 128, the circular groove segments 130, 132, 134, 136 each protrude from the bottom surface 150 of the base 102. The protruding radial channels 116 form weight-bearing legs 154 for supporting the food-receiving portion 108 when the base is disposed on a resting surface, such as a countertop, oven or another food container, for example, as shown in FIGS. 1-3 and 5, for example. Similarly, in the illustrated implementation, the protruding radial sector channels 128 protrude from the bottom surface 150 of the base 102 the same distance as the legs 154, forming weight-bearing legs 155 for further supporting the food-receiving portion 108 when the base is disposed on a resting surface, as is also shown in FIGS. 1, 2, and 5, for example. The protruding circular groove 118 and the central well 114 also protrude from the bottom surface 150 the same distance as the legs 154, 155, to form weight-bearing supports 156, 157 to further support the food-receiving portion 108 when the base is disposed on a resting surface, as shown in FIG. 5.

In the illustrated implementation, the protruding circular groove segments 130, 132, 134, 136, referred to collectively as 159, protrude from the bottom surface 150 of the base 102 a smaller distance than the legs 154, 156 and do not, therefore, form weight bearing supports or legs. (See FIG. 6, discussed below.) In other implementations, the protrusions 159 may extend the same distance from the bottom surface 150 as the legs 154, 155 and supports 156, 157, forming additional weight-bearing legs.

The legs 154, 155 and the supports 156, 157 define air spaces below the food item, providing additional insulation to that provided by the features of the container 100 discussed above. The legs 154, 155 and the supports 156, 157 also increase the rigidity and strength of the base 102. Additionally, the legs 154, 155 and the supports 156, 157 raise the remainder of the base 102 (and cover 104 when engaged with the base) slightly above a resting surface, which causes a shadow to be cast, similar to a more formal serving plate.

FIG. 6 is a partial sectional view through lines 6-6 of FIG. 5, showing sections of the protrusions 159 corresponding to the circular groove segments 130, 132, 134, 136, and the dome-shaped indents 152 corresponding to the protrusions 137. FIG. 6 shows that the bottoms of the circular groove protrusions 159 do not extend as far below the bottom surface 150 as the bottoms of the legs 154 corresponding to the radial channels 116, as discussed above. A sectional view of the connection C between the base 102 and the corner 104 is also shown. The sectional view of the cover 104 is discussed below.

Returning to FIGS. 2-4, at the top of the upwardly extending sidewall 110 of the base 102 is a peripheral rim 124, also referred to as a fastening rim 124. The fastening rim 124 forms an upwardly extending protrusion to be received by a recess or cavity 226 defined by the cover 104, as shown in FIGS. 2, 3, 6 and 7A, for example.

Figure 7A:
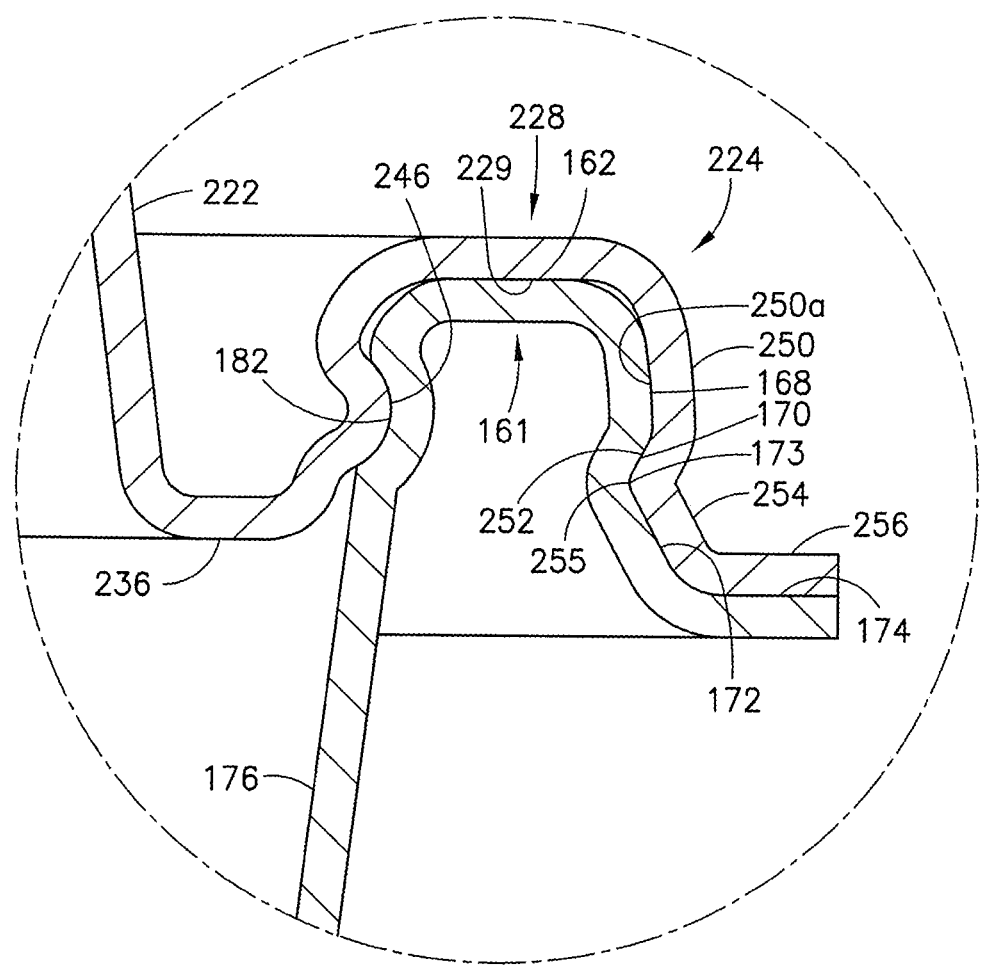
FIG. 7A is an enlarged view of the connection 6 of the cover and the base of FIGS. 3 and 6.
Figure 7B:
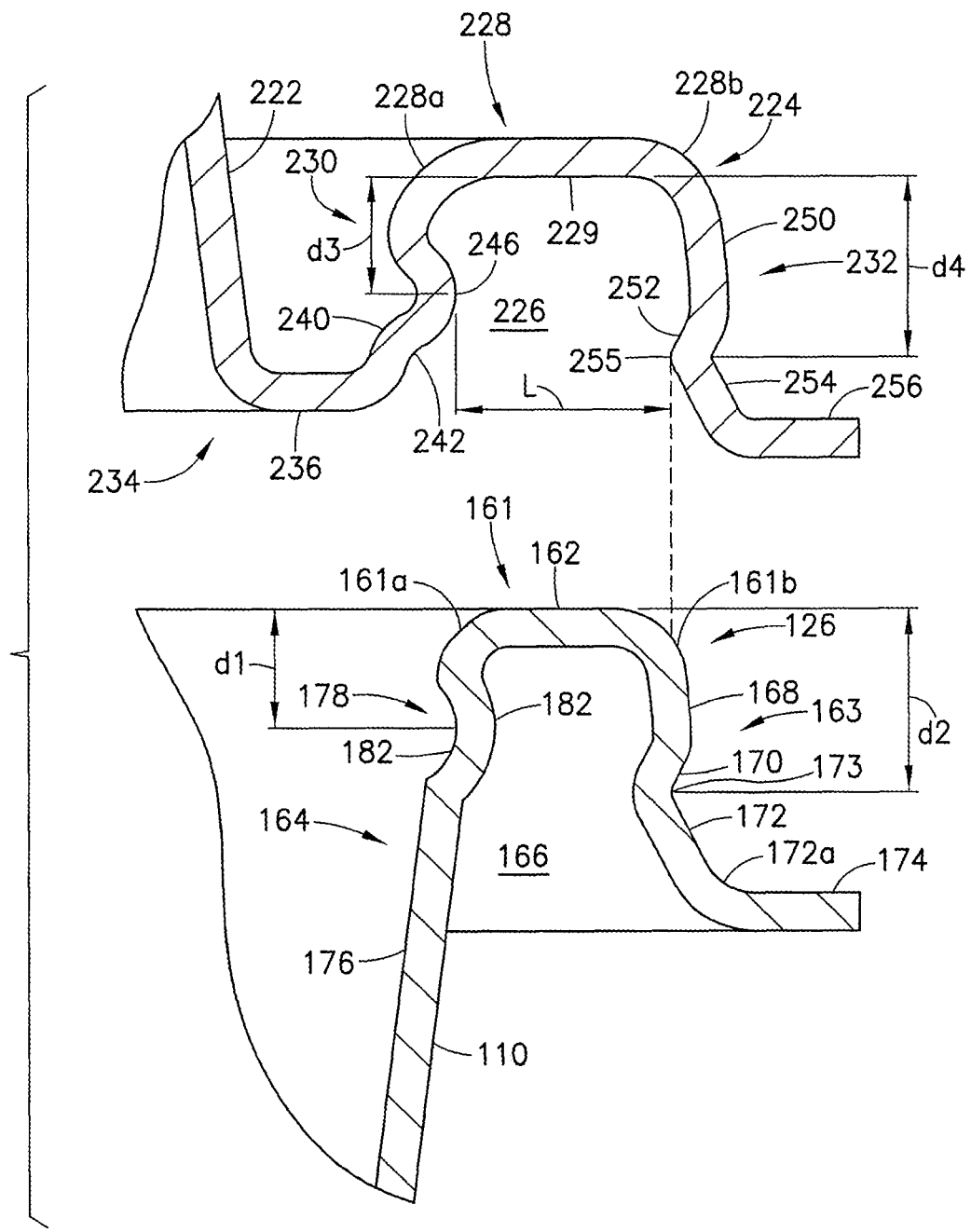
FIG. 7B shows the enlarged view of FIG. 7A, with the cover and the base separated.

FIG. 7A is an enlarged view of the section C of FIGS. 3 and 6, which better shows the fastening rim 124 of the base 102 received within a recess defined by a fastening rim 224 of the cover 104 to connect the cover to the base. FIG. 7B shows the fastening rim 224 of the cover 104 and the fastening rim 124 of the base 102 prior to the cover being attached to base.

In the illustrated implementation, the fastening rim 124 of the base 102 comprises a raised segment 161 having an upwardly facing apex surface 162. In this example, the upwardly facing apex surface 162 is planar. The raised segment 161 has an inner shoulder segment 161a and an outer shoulder 161b, both of which are rounded. The fastening rim 124 further includes an outer, downwardly extending sidewall 163, and an upper portion 164 of the upwardly extending sidewall 110, which together define a recess or cavity 166. In the discussions below, the term "inward" and "outward" describe directions with respect to the recess 166.

In this implementation, the downwardly extending sidewall 163 includes a first portion 168 extending downwardly and slightly outwardly from the raised upwardly facing apex surface 162. The downwardly extending sidewall 163 further includes a second portion 170 extending downwardly and inwardly from the first portion 168, into the cavity 166. A third portion 172 extends downward and outwardly from the second portion 170, away from the cavity 166. The second portion 170 and the third portion 172 form an outwardly facing recess 173. The downwardly extending sidewall 163 terminates in a substantially planar, outwardly extending flange 174 that extends outwardly from a bottom 172a of the third portion 172.

The upper portion 164 of the upwardly extending sidewall 110 includes a straight, slightly outwardly angled portion 176 and an inwardly curved portion 178 between the straight portion 176 and the inner shoulder segment 161a. The inwardly curved portion 178 defines an inwardly curved inner face 181 and an externally facing recess 182. The fastening rim 224 of the cover 104 will be discussed below in conjunction with the cover.

In the illustrated implementation, the externally facing recess 182 is at a distance d1 from the upwardly facing apex surface 162. The outwardly facing recess 173 is at a distance d2 from the upwardly facing apex surface 162 that is greater than d1. In other implementations d1 may be greater than or equal to d2.

In the illustrated implementation, all the components of the fastening rim 124 are annular and extend around the base of the container 102. In other implementations, the container may have other shapes, such as rectangular, triangular, and octagonal, for example, and the fastening rim 124 would have corresponding shapes.

Figure 8:
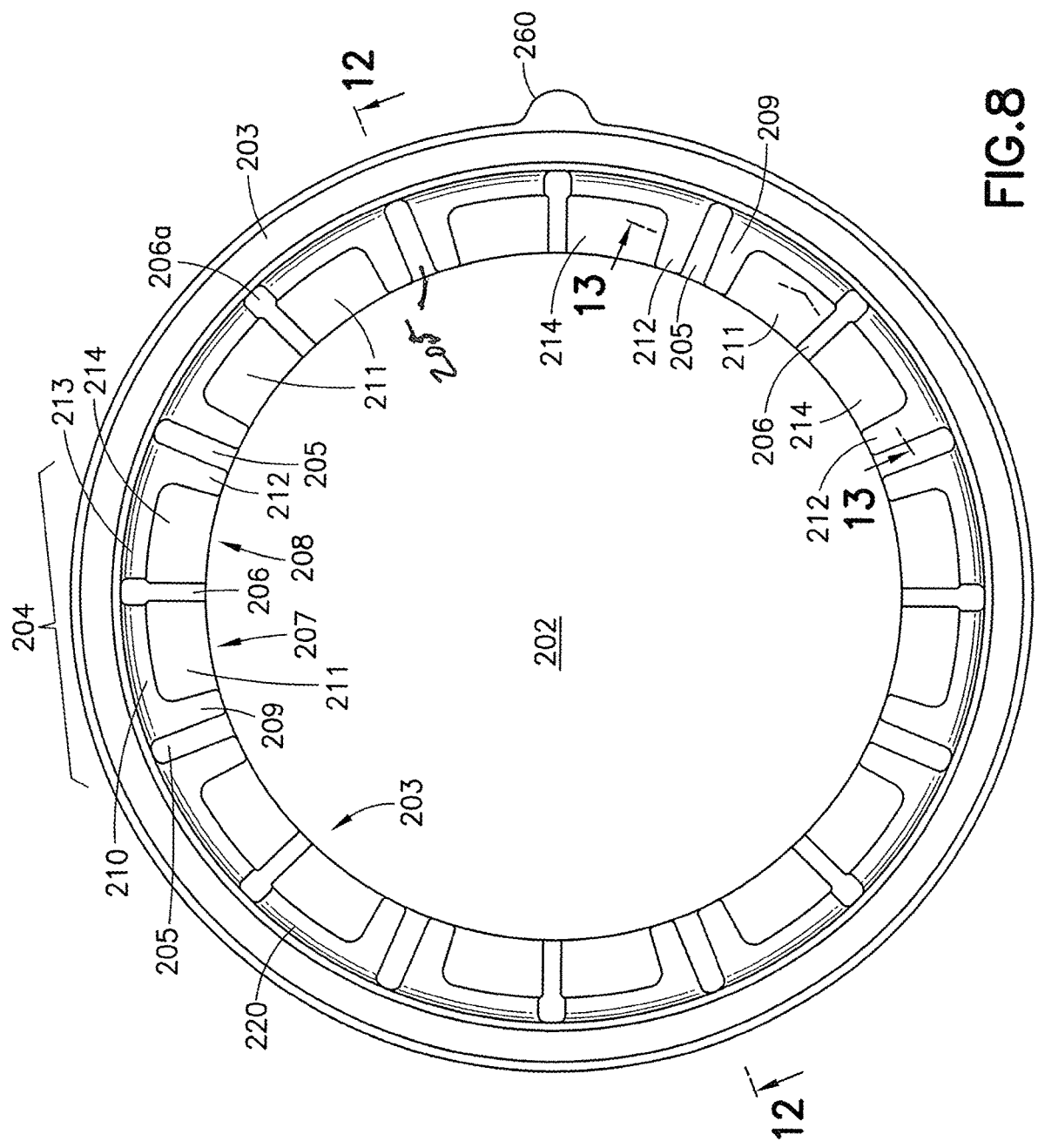
FIG. 8 is a top plan view of the cover of the food container of FIG. 1.

Returning to FIGS. 1 and 2, the cover 104 of the container 100 includes an elevated portion 200 having a substantially upwardly facing exterior surface 201 that is substantially planar in the illustrated implementation. The cover 104 also includes a substantially downwardly facing interior surface 202, which in the illustrated embodiment is also substantially planar, as shown in FIGS. 3 and 6. Details of the cover 104 are also shown in FIG. 8, which is a top plan view of the cover 104 in FIG. 8.

A circumferential section 203 of the cover 104 around the outer portion of the upwardly facing exterior surface 201 is raised with respect to the upwardly facing exterior surface. The circumferential section 203 comprises segments 204 separated by partial radial grooves 205. In the illustrated implementation, eight (8) segments 204 are provided, which corresponds to the number of sector portions 122.

Each segment 204 is bisected by an inner radial groove 206, forming two adjacent sub-segments 207, 208. Each sub-segment 207, 208 includes a sidewall 209, a peripheral wall 210, and a recessed, rectangular section 211 that is bounded on three sides by the sidewall 209, the peripheral wall 210, and the inner radial groove 206. Each sub-segment 208 includes a sidewall 212, a peripheral wall 213, and a recessed, rectangular section 214 that is bounded on three sides by the sidewall 212, the peripheral wall 214, and the inner radial groove 206.

One open side of each recessed, rectangular section 211 of each segment 204 is adjacent to an open side of an adjacent rectangular section 214 in the segment 204, across the inner radial groove 206. Each recessed rectangular section 211, 214 also has one open side that is adjacent to the upwardly facing exterior surface 201. Bottom surfaces of the partial radial grooves 205 and the inner radial grooves 206 are above the upwardly facing exterior surface 202 in the illustrated implementation, as shown in FIGS. 1, 2, 3, and 6, for example. A sidewall 222 extends downwardly and outwardly from an outer edge 223 of the circumferential portion 203.

Each inner radial groove 206 includes an edge section 206a between the peripheral walls 210, 213 that is wider than the width of the remainder of the inner radial groove. The edge section 206a adds strength and rigidity to the cover 102 and also assists in aligning a base 102 of an upper container with a cover 104 of a lower container during stacking, as discussed below.

Figure 9:
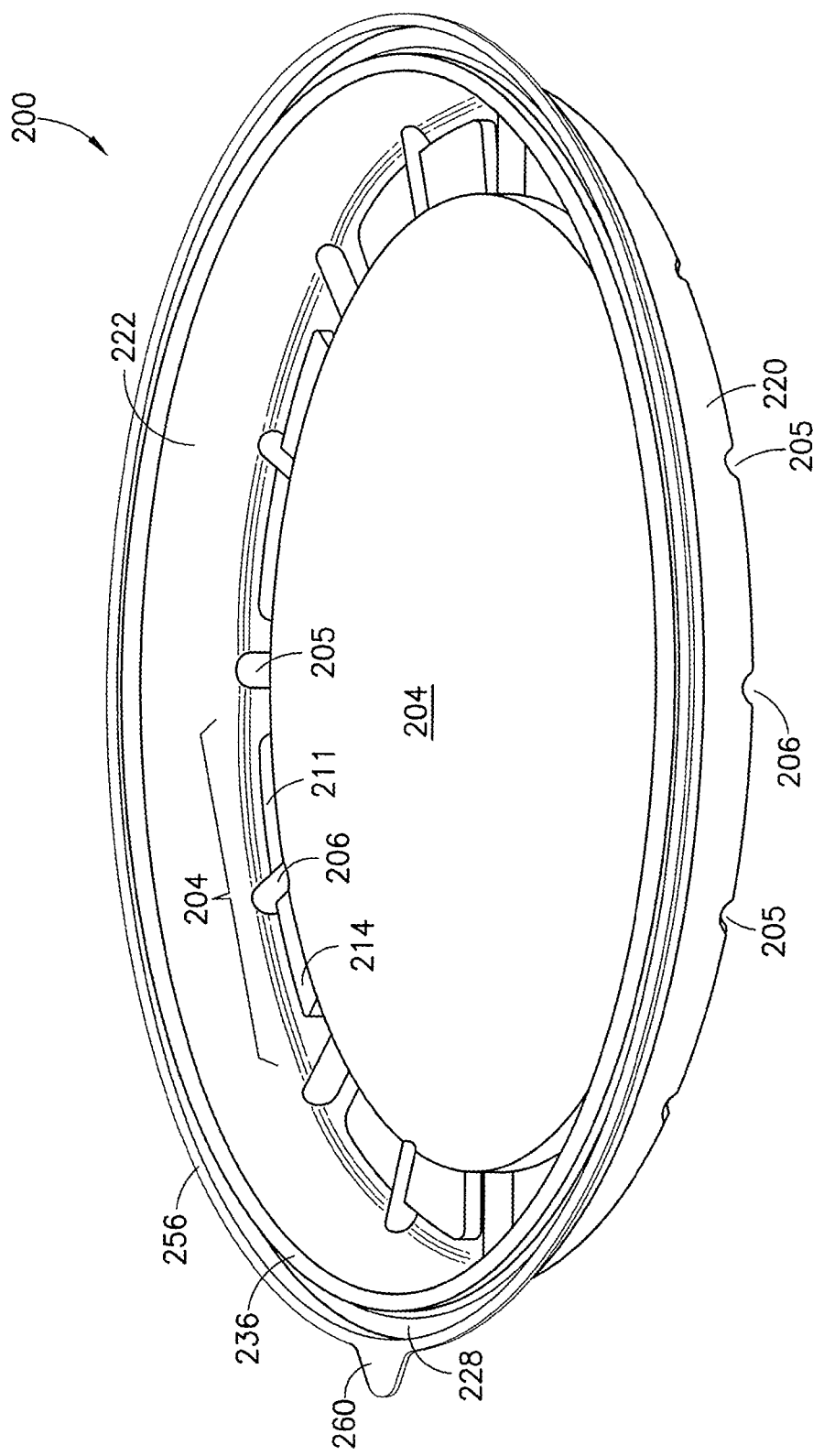
FIG. 9 is a bottom perspective view of the cover of the food container of FIG. 1.

FIG. 9 is a bottom perspective view of the cover 104 showing the downward facing interior surface 202. Also shown are the undersides of the segments 204, which protrude from the bottom of the cover 104. The protruding portions of the segments 204 are identified by the same numerals as were used to describe the components of the segments 204 on the top of the cover 104 in FIGS. 1, 2, and 8, for example.

Returning to FIGS. 7A and 7B, the fastening rim 224 of the cover 104 is provided around the sidewall 222. The fastening rim 224 defines a cavity 226 to receive the peripheral rim 116 of the base 102, to close the container 100. In the illustrated implementation, the fastening rim 224 comprises a raised segment 228 having an upwardly facing apex surface 229 and a downwardly facing surface 229a. The downwardly facing surface 229a is planar. The raised segment 228 has an inner shoulder 228a and an outer shoulder 228b which are rounded. Opposing inner wall 230 and outer wall 232 depend from the inner shoulder 228a and the outer shoulder 228b, respectively. The raised segment 2doiwn229a28, the inner walls 230, and the outer wall 232 define the cavity 226 discussed above. In the following discussion of the fastening rim 224 and the cavity 226, the terms "inward" and "outward" are directions with respect to the interior of the cavity 226.

The fastening rim 224 is displaced from the bottom 234 of the downwardly extending sidewall 222 via a connecting wall 236, which, in the illustrated implementation, is substantially planar and extends laterally outward from the bottom 234. The inner leg 230 extends upward from the connecting wall 236, to the inner shoulder 228a of the upwardly facing apex surface 228.

The inner leg 230 includes a first portion 240 that extends upward and inward angle from the connecting wall 236, toward the cavity 226. The inner leg 230 may extend inward about 60 degrees from a plane through the connecting wall 236. The inner leg 230 includes a second, inwardly curved portion 246 between the first portion 240 and the inner shoulder 228a of the raised segment 228.

The outer leg 232 includes a first portion 250 depending downward and outward at a slight angle from the outer shoulder 228b of the upwardly facing apex surface 228. A second portion 252 of the outer leg 232 depends inwardly from the first portion 250, at an angle of about 20 degrees with respect to a vertical line. A third portion 254 depends downward and outward from the second portion 252 at an angle of about 30 degrees. The second portion 252 and the third portion 254 form a protrusion 255 that protrudes into the cavity 226, toward the inner leg 230. The outer leg 232 terminates a planar, outwardly extending flange 256.

In the illustrated implementation, the inward most point of inwardly protruding section 246 is at a distance d3 from the bottom surface 229a of the raised segment 228. The protrusion 255 is at a distance d4 from the bottom surface 229a of the raised segment 228, which is greater than d3. In other implementations, the distance d3 may be greater than or equal to the distance d4. In the illustrated implementation and other implementations the distances d1 and d3 are equal and the distances d2 and d4 are equal.

In the illustrated implementation, all the components of the fastening rim 224 are annular and extend around the base of the cover 104. In other implementations, the cover 104 may have other shapes, such as rectangular, triangular, and octagonal, for example, and the fastening rim 224 would have corresponding shapes.

In addition, in the illustrated implementation, d4 minus d3 is equal to d2 minus d1. The protrusion 255 is thereby received in the outwardly facing recess 173 and the inwardly curved portion 246 is received in the externally facing recess 182 at the same time. In other implementations, the protrusion 255 need not be received in the outwardly facing recess 173 at the same time the inwardly curved portion 246 is received in the externally facing recess 182.

As shown in FIG. 1, for example, the cover 104 includes a tab 260 that extends outward from the outwardly extending flange 256. The tab 260 may be planar in shape or may have an upwardly extending distal portion. In either case, the tab 260 may be grasped by the user to remove the cover 104 from the base 102 during use, facilitating removal of the cover 104 from the base 102 by a user, for example. Use of the tab 260 to open the container 100 is discussed below.

To attach the cover 104 to the base 102, the cavity 226 of the fastening rim 224 of the cover 104 receives the protrusion defined by the fastening rim 124 of the base, as shown, for example, in FIG. 7A. In some implementations, the cavity 226 of the cover 104 may be sized and dimensioned to receive the peripheral rim 126 responsive to an external force pushing the cover 104 and the fastening rim 224 over the fastening rim 126 when the cover 104 is placed on the base 102, in a snap-fit. The external force may be applied by a machine or manually, for example.

In particular, in the illustrated implementation, pizza or another food item is placed on the food-receiving portion 108 of the base 102, and the cover 104 is placed on the base 102. As the cover 104 is lowered onto the base 102, the outer shoulder 161b of the fastening rim 124 typically contacts a portion of the third portion 254 of the outer leg 232 of the fastening rim 224 proximate to the protrusion 255. If the fastening rim 126 of the base 102 is not properly aligned with the recess 226 of the cover 104, the third portion 254 may assist in aligning the fasting rim and the recess.

As the cover 104 is pushed downward, the outer shoulder 161b of the raised segment 161 contacts the third portion 254 and pushes the third portion and the protrusion 255 outward. The protrusion 255 then slides downward along the external surface of the first portion 168 of the downwardly extending sidewall 163.

At the same time that the outer shoulder 161b contacts the third portion 254, or soon after, the inner shoulder 161a of the fastening rim 124 contacts the concave inner surface 242 of the fastening rim 224 of the cover 104. Continued pushing of the cover 104 onto the base 102 results in the protrusion 255 sliding along the slightly outwardly extending first portion 168, pushing the protrusion 255 and flexing the outer wall 232 outward, increasing the distance L between the inwardly protruding second portion 246 of the inner leg of the protrusion 252. The distance L increases until the protrusion 255 is adjacent the second portion 170 of the outer, downwardly extending sidewall 163. The restoring force of the outwardly flexed downwardly extending sidewall 232 moves the downwardly extending sidewall inward, decreasing the distance L, until the protrusion 255 is received within the outwardly facing recess 173, locking the cover 104 to the base 102 in a snap fit. At the same time the inwardly curved portion 246 is received in externally facing recess 182, also in a snap fit. The cover 104 is thereby connected to the base 102 in a dual snap fit.

As discussed above, since in the illustrated implementation the distances d1 and d3 are equal and the distances d2 and d4 are equal, as discussed above, the protrusion 255 is received in the outwardly facing recess 173 and the inwardly curved portion 246 is received in the externally facing recess 182 at the same time.

Depending on the relative positions and dimensions of the components of the fastening rim 126 of the base 102 and the fastening rim 224 of the cover 104, when the protrusion 255 is in the recess 173, the downwardly extending sidewall 232 may be adjacent to or bear against the downwardly extending sidewall 232. Similarly, depending on the relative positions and dimensions of the components of the fastening rim 126 of the base 102 and the fastening rim 224 of the cover 104, when the inwardly curved portion 246 is received in the externally facing recess 182, the upper portion 164 of the upwardly extending sidewall 110 may be adjacent to or bear against the opposing inner wall 230. Other surfaces of the fastening rim 224 may be adjacent to, bear against, or have gaps between adjacent surfaces of the fastening rim 126, depending the dimensions of the cover 104 and the base 102.

In an implementation where one or more adjacent surfaces of fastening rim 224 and the fastening rim 126 bear against each other, a fastening force is generated that further facilitates holding of the cover 104 in a closed position on the base 102. Such fastening force resists external forces applied to the container 100 so that the container remains closed throughout storage, transportation, or any other function of the container. In addition, the fastening force forms a "seal" which may limit or even prevent the flow of air into or out of the enclosed chamber 106 that houses the food item.

To open the container 100, a user may lift the cover tab 260 shown in of FIG. 1 while holding 173 the base 102. Lifting the tab 260 removes the protrusion 255 from the outwardly facing recess 173 in a region proximate the tab. As the tab 260 continues to be lifted, more of the fastening recess 226 is removed from the fastening rim 126 until the cover 104 completely, removed from the base 102. The tab 260 needs to be initially lifted with sufficient force to break the seal.

For a plastic blister or thermoform package, due to its elastic property, when a fastening or positioning mechanism is separated the mechanism will generate an audio cue (e.g., "snap") to signal the movement. This is due to the "undercut" design, which is a commonly known design technique in the plastic packaging industry. Such is feasible because the plastic molding process allows the undercut design. For paper or molded pulp products, it may not be possible to make such an undercut design, and therefore it is typically accepted that a molded pulp package cannot have any locking design with an audible snap function. However, in some implementations of the present disclosure, due to the combination of the dimensions of the interference, the angle, and the thickness of the base 102 and cover 104, the fastening mechanisms provide an unexpected performance with an audible cue (e.g., "snap") when the fastening protrusions are disengaged from the corresponding fastening recesses.

The base 102 and cover 104 of the food container 100 may also be nestable with other bases and covers, respectively, with a minimum amount of vertical height (i.e., essentially the thickness of the material for each component). That is, when a first base 102 is stacked on top of a second base, the top surfaces of certain features of the lower second base are positioned adjacent the bottom surfaces of corresponding features of the upper first base, with minimal air space there between. Similarly, when a first cover 104 is stacked on top of a second cover, the top surfaces of the features of the lower second cover are positioned adjacent the bottom surfaces of corresponding features of the upper first cover. Thus, numerous bases may be stacked together at a height that is much less than the combined height of the individual bases. Similarly, numerous covers 104 may be stacked together at a height that is much less than the combined height of the individual covers. Such nesting feature is advantageous for shipping and for storing the food containers 100 in a small space (e.g., restaurant, vehicle, packaging).

Further, unlike conventional pizza boxes formed from a cardboard blank that has to be folded, no pre-assembly is required. Thus, the base 102 and cover 104 need not be handled by a user until they are selected for use to perform its intended function, significantly reducing the likelihood of contamination.

A user may select a base 102 from a stack of nested bases, place a food item (cooked or uncooked) onto the food-receiving portion 108 of the base, select a cover 104 from a stack of nested covers, and lower the cover onto the base as shown in FIG. 2, for example.

Figure 10:
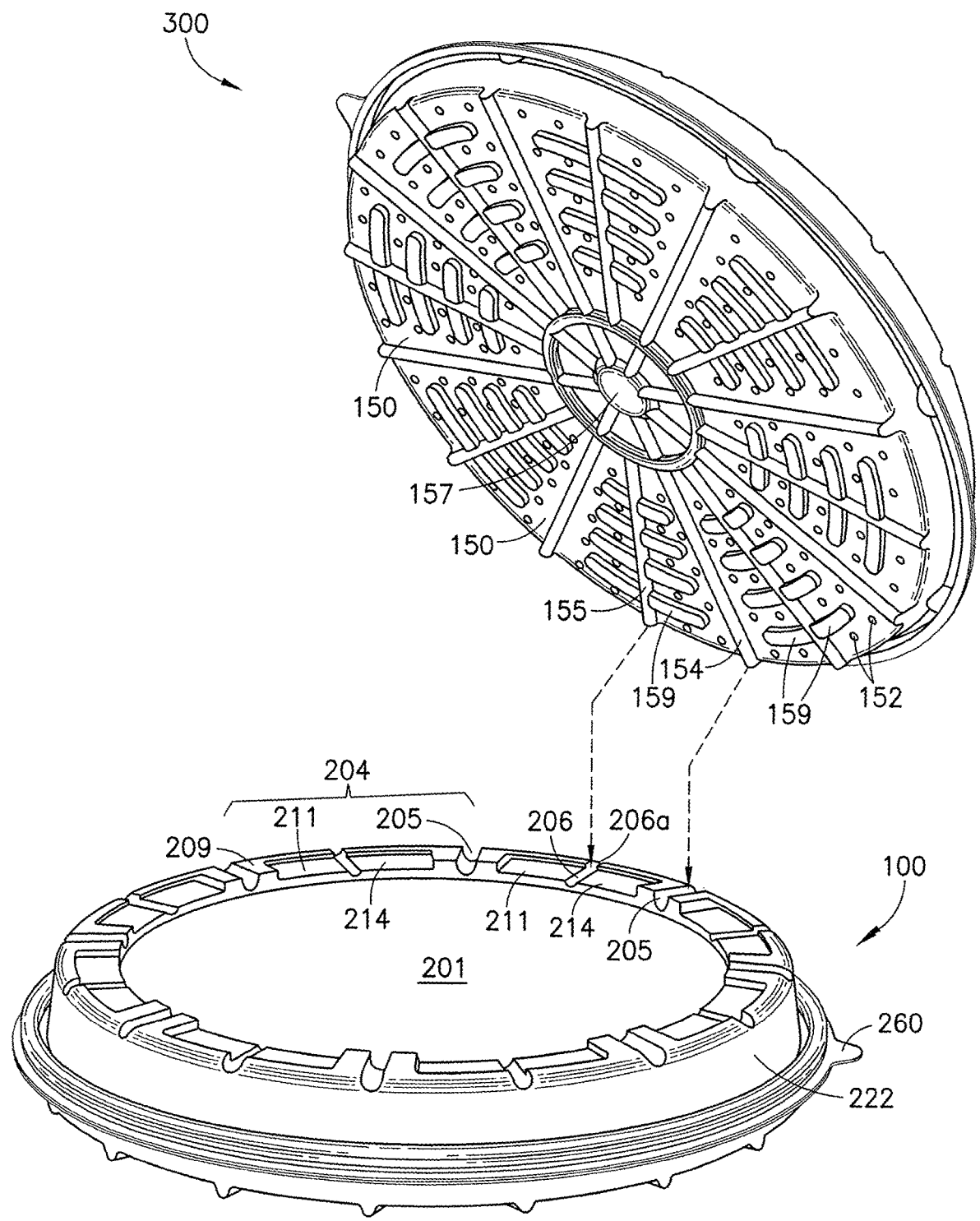
FIG. 10 is a front elevation view of two of the food containers of FIG. 1, in a stacked relationship.

FIGS. 10-13 show how the food container 100 is stackable with one or more other food containers, such as another food container 300 that is substantially the same or identical to the food container 100. FIG. 10 is a perspective view of a first container 100 and a second container 300 oriented to show how legs 152, 154 at the bottom 150 of the container 300 fit within a segment 204, partial radial groove 205 and an inner radial groove 206 of the cover 104 of the first container 100. Each of the partial grooves radial 205 are sized and dimensioned to receive a portion of the legs 152 corresponding to the radial channels 116 and the inner radial grooves 206 are sized and dimensioned to receive the legs 154 corresponding to the protruding radial sector channels 128. As noted above, the number of segments 204 correspond to the number of sectors 122 in the illustrated implementation.

In addition, it is apparent from FIG. 10, that the recessed sections 211, 212 are sized and dimensioned to receive the supports 159 corresponding to the outermost circular channels 130 when stacked.

In the illustrated implementation, the shape of the legs 152, 154 complement the shape of the partial radial grooves 205 and the inner radial grooves 206, respectfully, to maximize the contact surface area between the legs 152, 154 and the grooves 205, 206. Thus, the legs 152, 154 also support the second container 300 on top of the cover 104 of the lower container 100. The edge section 206a, which is wider than the remainder of the inner radial grooves 206, provides increased rigidity and strength to the cover 104. The edge section 206a also assists in aligning a weight-bearing leg 155 in respective inner radial groove 206.

Figure 11:
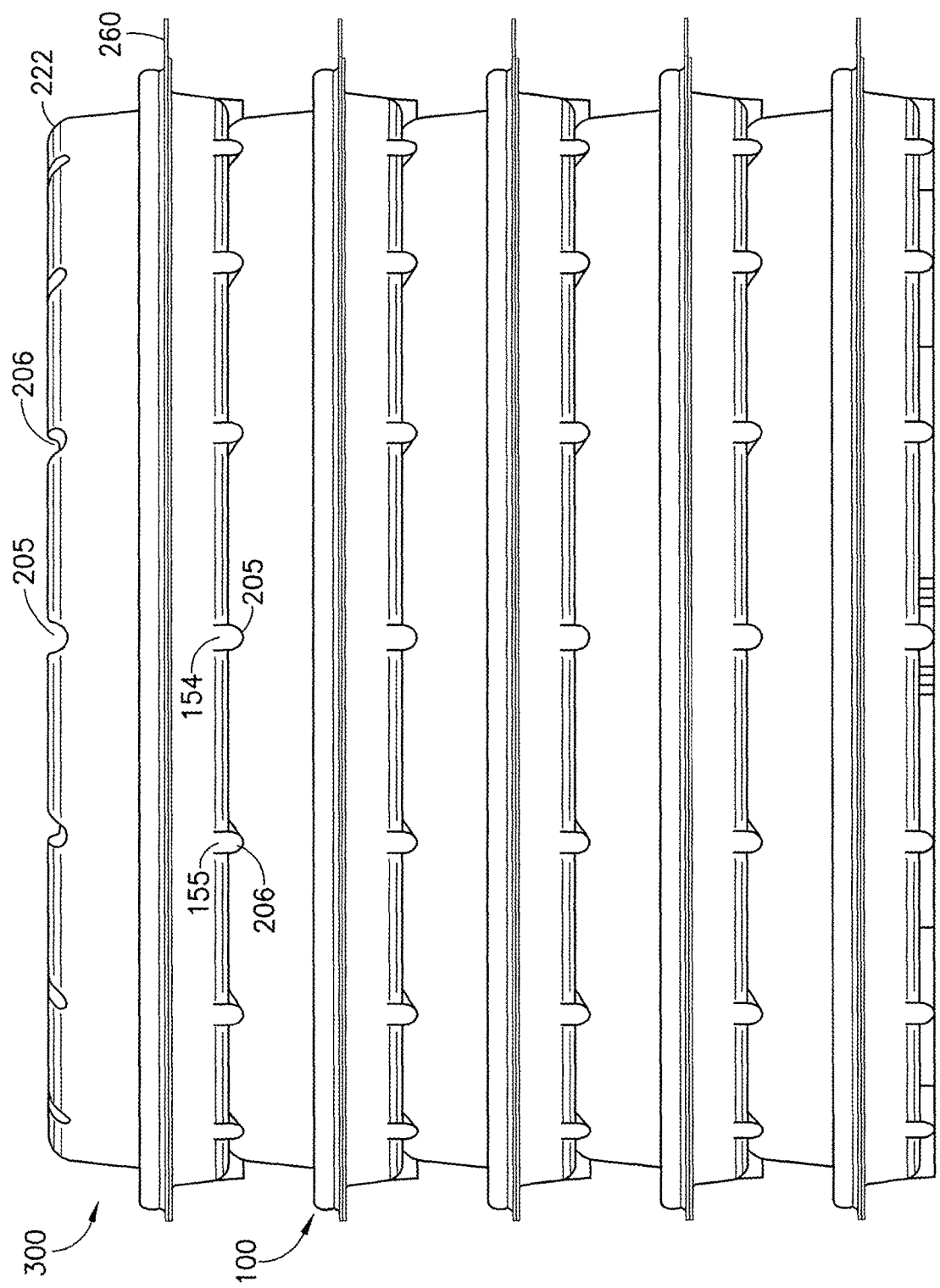
FIG. 11 is a front elevation view of five (5) of the food containers as in FIG. 1, in a stacked relationship.
Figure 12:
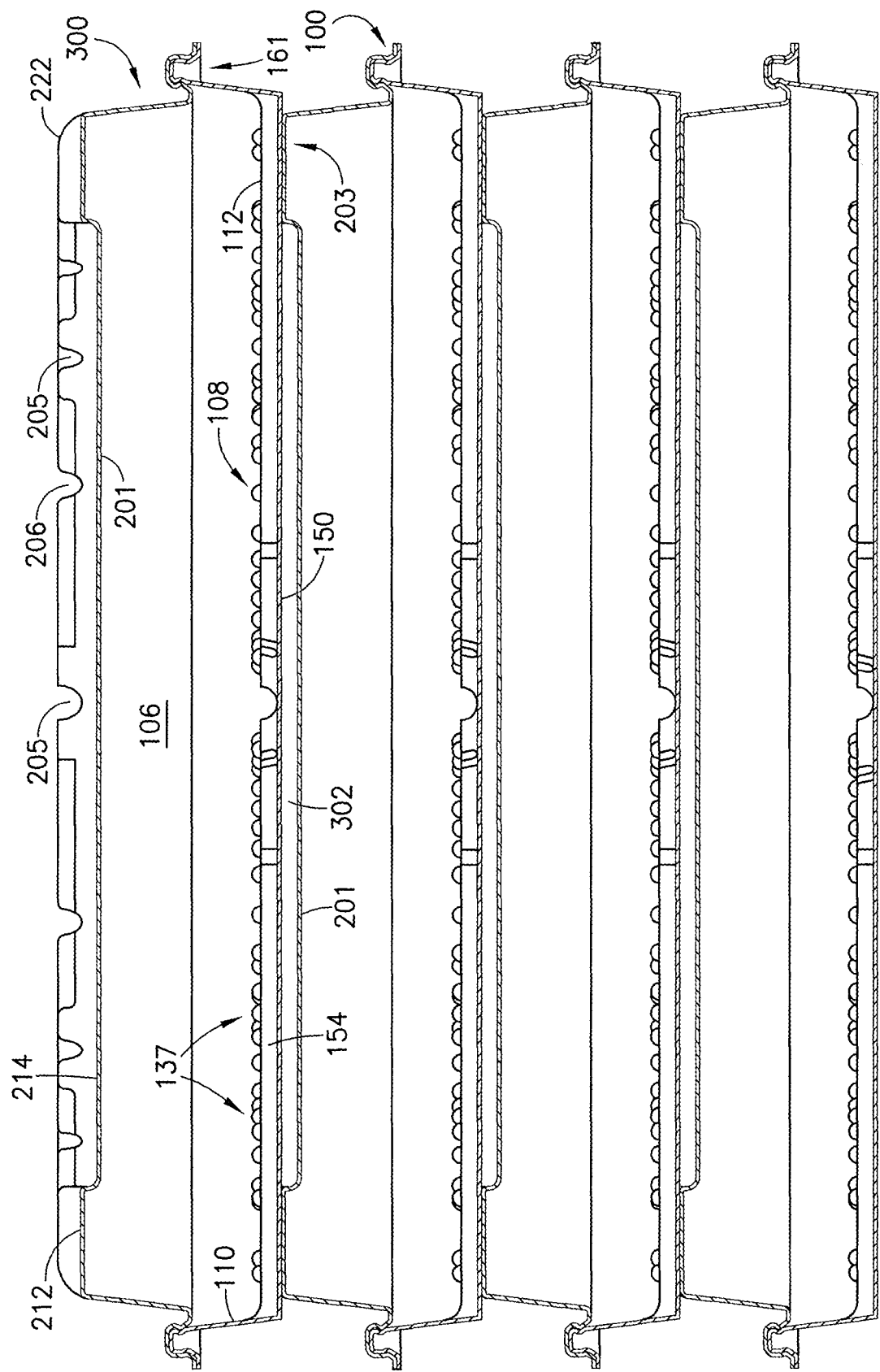
FIG. 12 is a sectional view of the five (5) of the food containers as in FIG. 1 in a stacked relationship, through line 12-12 of the container of FIG. 8.
Figure 13:
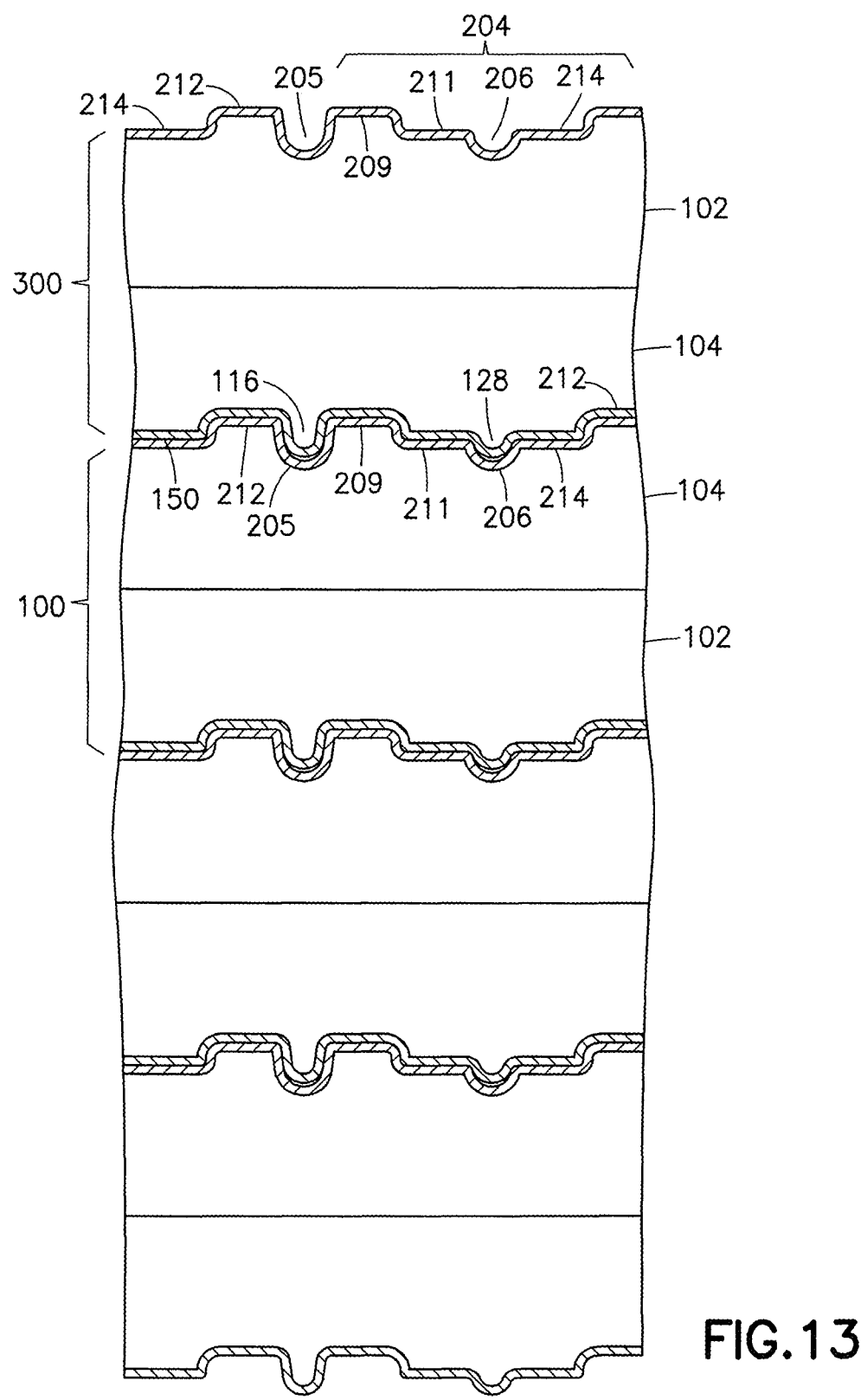
FIG. 13 is a sectional view of a portion of five (5) food containers as in FIG. 1 in a stacked relationship, through line 13-13 of the container of FIG. 8.

FIG. 11 is a side view of five (5) stacked containers including container 100 and container 300. FIG. 12 is a sectional view of the five (5) stacked containers of FIG. 11, through line 12-12 of FIG. 8. FIG. 13 is a partial sectional view of five (5) stacked containers through line 13-13 of FIG. 8.

In the sectional view of FIG. 12, the container 100 and the container 300 are in contact at the raised circumferential portion 203 and not in contact in the space 302 between the bottom 150 of the container 300 and the upwardly facing exterior surface 201. As discussed above, the segments 204 of the cover 104 are provided on a raised circumferential section 203 that is raised above the upwardly facing exterior surface 201. Portions of the legs 154 are in the partial radial grooves 205, and portions of the legs 155 are in the inner radial grooves 206. The surface 201 of the cover 104 of the container 100 is not, therefore, in contact with the bottom surface 150 of the base 102 of the container 300. This provides a substantial air space in the space 302 between the two containers 100 and 300, minimizing heat transfer between them.

Additionally, since portions of the food product are raised above the food-receiving portion 108 of the base 102 of the upper food container 300 by the protrusions 137, surfaces of the food containers 100, 300 adjacent the hot food products have decreased contact with each other when the containers 100, 300 are stacked, which further decreases heat transfer between containers.

As discussed above, the raised circumferential section 203 of the elevated portion 200 is structurally rigid and serves to distribute supporting forces of the legs 152 of the base 102 when the upper food container 300 is stacked on the cover 104 of the lower food container 100. Moreover, when the upper food container 300 is stacked on the lower food container 100 and the weight bearing legs 154, 155 are received in the partial radial grooves 205 and inner radial grooves 206, respectively, the food container 100 and the food container 300 are restricted from lateral or rotational movement with respect to each other. This helps keep the food containers in a stacked relationship during transportation of the food containers.

In the illustrated implementation, the upwardly facing exterior surface 201 of the cover 104 is circular in shape which facilitates printing (e.g., laser printing, pad printing) thereon with text and/or graphics (e.g., logo, image, instructions). In other implementations the surface 201 may have other shapes.

Changes may be made to the implementations in light of the above-detailed description. For example, while in the illustrated implementation the fastening rim 124 of the base 102 forms the upwardly extending protrusion to be received by a recess or cavity 226 defined by the cover 104, in other implementations the protrusion may be defined by the cover and the recess may be defined by the base.

Features of one or more of the implementations discussed herein may be modified and/or combined to provide further implementations.

We claim:

1. A food container comprising:
    a base of compostable fiber, the base comprising:
        a food-receiving portion comprising a planar surface that is upwardly facing and has a perimeter; and
        a sidewall extending upwardly from the base, around the perimeter;
        a central well extending downwardly from the planar surface;
        a plurality of first radial grooves extending downwardly from the planar surface;
        a plurality of partial circumferential grooves extending downwardly from the planar surface;
        a plurality of protrusions extending upwardly from the planar surface; and
    a cover of compostable fiber, the cover comprising:
        at least one wall sized and shaped to provide an interior chamber with the base when the cover is engaged with the base, closing the container;
        the at least one wall having a periphery,
    wherein one of the sidewall of the base and the periphery of the cover define a peripheral protrusion and the other of the sidewall of the base and the periphery of the cover define a peripheral recess, and
    the peripheral protrusion is receivable in the peripheral recess to selectively engage the cover with the base.

2. The food container of claim 1, wherein:
    the sidewall of the base defines, at least in part, the peripheral protrusion; and
    the cover defines, at least in part, the peripheral recess to receive the peripheral protrusion of the base to selectively engage the base.

3. The food container of claim 2, wherein:
    the peripheral protrusion is an annular protrusion extending around the entirety of the base; and
    the peripheral recess is an annular recess extending around the entirety of the cover.

4. The food container of claim 3, wherein the peripheral protrusion of the base comprises:
a first inner annular wall;
a first outer annular wall facing at least a portion of the first inner annular wall; and
a first intermediate portion having a first inner shoulder and a first outer shoulder, wherein the first inner annular wall is coupled to the first inner shoulder and the first outer annular wall is coupled to the first outer annular shoulder.

5. The food container of claim 4, wherein the peripheral recess of the cover is defined, at least in part, by:
a second inner annular wall;
a second outer annular wall facing at least a portion of the second inner annular wall;
a second intermediate portion having a second inner shoulder and second outer shoulder, wherein the second, inner annular wall is coupled to the first inner shoulder and the second outer annular wall is coupled to the second outer shoulder.

6. The food container of claim 5, wherein, when the peripheral recess receives the peripheral protrusion:
the first inner annular wall is adjacent to the second inner annular wall;
the first outer annular wall is adjacent to the second outer annular wall; and
the first intermediate portion is adjacent to the second intermediate portion.

7. The food container of claim 6, wherein, when the peripheral recess receives the peripheral protrusion:
at least one of the first inner annular wall and the second, inner annular wall bears against the other; and/or
at least one of the first outer annular wall and the second outer annular wall bears against the other.

8. The food container of claim 6, wherein:
one of the first inner annular wall and the second inner annular wall has an annular projecting portion that is received in a recessed portion of the other, when the peripheral recess receives the peripheral protrusion; and/or
one of the first outer annular wall and the second outer annular wall has a projection that is received in a recessed portion of the other, when the peripheral recess receives the peripheral protrusion.

9. The food container of claim 8, wherein:
the first inner annular wall defines a first annular recess;
the second inner annular wall defines a first annular protrusion received in the annular recess when the cover is engaged with the base; and
the first inner annular wall and the second inner annular wall are configured so that the first annular protrusion is received in the first annular recess when the cover is engaged with the base, via a snap fit.

10. The food container of claim 9, wherein:
the first outer annular wall defines a second outer annular recess;
the second outer annular wall defines a second annular protrusion received in the annular recess when the cover is engaged with the base; and
the first outer annular wall and the second outer annular wall are configured so that the second annular protrusion is received in the second annular recess when the cover is engaged with the base, via a snap fit.

11. The food container of claim 10, wherein:
the first annular protrusion and the first annular recess are at different heights in the peripheral recess; and the second annular protrusion and the second annular recess are at different heights on the peripheral protrusion.

12. The food container of claim 5, wherein the at least one wall of the cover comprises:
a top portion; and
a side wall depending from the top portion; and
an annular connecting wall extending outward from the bottom edge, connecting the side wall to the second annular inner wall.

13. The food container of claim 12, further comprising a tab extending outward from the second outer annular wall.

14. The food container of claim 12, wherein:
the top portion has a central planar portion and an outer circumferential portion outside of the central portion;
the outer circumferential portion is raised above the central planar portion; and
the side wall depends from the outer circumferential portion.

15. The food container of claim 14, wherein:
the base has a bottom surface with protruding portions; and
the outer circumferential portion of the cover is configured to receive the protruding portions of a bottom surface of a second food container when the second food container is stacked on the cover.

16. The food container of claim 15, wherein:
the protruding portions comprise radial protrusions in the food-receiving portion; and
the outer circumferential portion defines radial grooves configured to receive the radial protrusions.

17. The food container of claim 16, wherein the food-receiving portion defines:
a groove extending into the planar surface and positioned around the central well, the groove intersecting the first radial grooves and having a closed shape;
second radial grooves in the planar surface, extending from the perimeter to the groove;
wherein the first radial grooves and the second radial grooves define the protruding portions of the bottom.

18. The food container of claim 17, further comprising:
wherein the plurality of partial circumferential grooves extend from the second radial grooves and along concentric circles centered on a center of the central well.

19. A food container comprising:
a base comprising:
a food-receiving portion comprising a planar surface that is upwardly facing and has a perimeter; and
a sidewall extending upwardly from the base, around the perimeter;
a plurality of dome-shaped protrusions extending upwardly from the planar surface; and
a cover comprising:
at least one wall sized and shaped to provide an interior chamber with the base when the cover is engaged with the base, closing the container;
the at least one wall having a periphery,
wherein one of the sidewall of the base and the periphery of the cover define a peripheral protrusion and the other of the sidewall of the base and the periphery of the cover define a peripheral recess, and
the peripheral protrusion is receivable in the peripheral recess to selectively engage the cover with the base.

20. A food container comprising:
a base comprising:
a food-receiving portion comprising a planar surface that is upwardly facing and has a perimeter; and a sidewall extending upwardly from the base, around the perimeter;

a plurality of partial circumferential grooves extending downwardly from the planar surface, wherein the plurality of partial circumferential grooves extend along concentric circles centered on a center of the planar surface; and a cover comprising:

at least one wall sized and shaped to provide an interior chamber with the base when the cover is engaged with the base, closing the container;

the at least one wall having a periphery, wherein one of the sidewall of the base and the periphery of the cover define a peripheral protrusion and the other of the sidewall of the base and the periphery of the cover define a peripheral recess, and the peripheral protrusion is receivable in the peripheral recess to selectively engage the cover with the base.

\* \* \* \* \*